(12) United States Patent
Parks et al.

(10) Patent No.: US 7,950,317 B2
(45) Date of Patent: May 31, 2011

(54) MITER SAW WITH TOP TABLE

(75) Inventors: James R. Parks, White Hall, MD (US); Pierluigi Spinelli, Perugia (IT); Sion Netzler, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 137 days.

(21) Appl. No.: 11/668,125

(22) Filed: Jan. 29, 2007

(65) Prior Publication Data

US 2007/0221026 A1 Sep. 27, 2007

(30) Foreign Application Priority Data

Jan. 31, 2006 (GB) .................................. 0601924.4
Feb. 1, 2006 (GB) .................................. 0602016.8

(51) Int. Cl.
*B26D 7/01* (2006.01)
(52) U.S. Cl. .................... 83/467.1; 83/471.3; 83/581
(58) Field of Classification Search .............. 83/471, 83/471.3, 467.1, 468.1–468.3, 468.5–468.7, 83/581, 473, 490, 391, 392
See application file for complete search history.

(56) References Cited

U.S. PATENT DOCUMENTS

| | | |
|---|---|---|
| 4,489,633 A | 12/1984 | van de Wouw |
| 5,257,570 A | 11/1993 | Shiotani et al. |
| 5,752,421 A | 5/1998 | Chang |
| 5,755,148 A * | 5/1998 | Stumpf et al. ............... 83/468.2 |
| 5,855,366 A * | 1/1999 | Chang ............................ 269/315 |
| 5,893,311 A | 4/1999 | Huang |
| 5,943,931 A * | 8/1999 | Stumpf et al. ............... 83/468.2 |
| 5,957,022 A * | 9/1999 | Stumpf et al. ............... 83/468.2 |
| 6,073,529 A * | 6/2000 | Shibata et al. ............... 83/468.5 |
| 6,279,442 B1 | 8/2001 | Chang |
| 6,418,830 B1 * | 7/2002 | Stumpf et al. ............... 83/468.2 |
| 6,899,005 B1 * | 5/2005 | O'Banion et al. ........... 83/468.3 |
| 2002/0100350 A1 | 8/2002 | Brazell |
| 2004/0089125 A1 * | 5/2004 | Schoene et al. .............. 83/471.3 |

FOREIGN PATENT DOCUMENTS

| | | |
|---|---|---|
| DE | 29 08 211 B1 | 6/1980 |
| DE | 20 2004 019137 U1 | 5/2005 |
| EP | 1 033 211 A2 | 9/2000 |
| EP | 1 038 622 A | 9/2000 |
| EP | 1033211 A2 | 9/2000 |
| EP | 0 875 347 B1 | 3/2005 |
| FR | 2 123 954 A | 9/1972 |
| FR | 2 450 151 A | 9/1980 |
| GB | 1 435 056 A | 5/1976 |
| IT | 0001328103 | 7/2005 |
| JP | 08 215927 A | 8/1996 |

(Continued)

OTHER PUBLICATIONS

Mark Rijks, European Search Report, Nov. 28, 2007, The Hague.

(Continued)

*Primary Examiner* — Phong H Nguyen
(74) *Attorney, Agent, or Firm* — Adan Ayala

(57) ABSTRACT

A saw assembly has a fixed fence and a moveable fence. The fixed fence has a groove for receiving a tongue of the moveable fence. The tongue of the moveable fence has a first groove and a second groove for controlling a range of movement of the moveable fence relative to the fixed fence.

5 Claims, 27 Drawing Sheets

FOREIGN PATENT DOCUMENTS

| | | |
|---|---|---|
| JP | 08-215927 A | 8/1996 |
| JP | 08-309618 A | 11/1996 |
| JP | 2005 178281 A | 7/2005 |
| JP | 2005-178281 A | 7/2005 |
| WO | WO 98/18588 A | 5/1998 |

OTHER PUBLICATIONS

Annex to the European Search Report on European Patent Application No. EP 07 10 1074.
Mark Rijks, European Search Report, Apr. 29, 2008, The Hague.
Annex to the European Search Repoli on European Patent Application No. EP 08 10 2972.
Mark Rijks, Partial European Search Report, Apr. 27, 2007, The Hague, Netherlands.
Annex to the European Search Report on European Patent Application No. EP 07 10 1074.
Mark Rijks, European Search Report, May 29, 2008, The Hague.
Annex to the European Search Report on European Patent Application No. EP 08 10 2973.
Mark Rijks, European Search Report, Jun. 2, 2008, The Hague.
Annex to the European Search Report on European Patent Application No. EP 08 15 5602.
Annex to the European Search Report on European Patent Application No. EP 09 16 0907.

\* cited by examiner

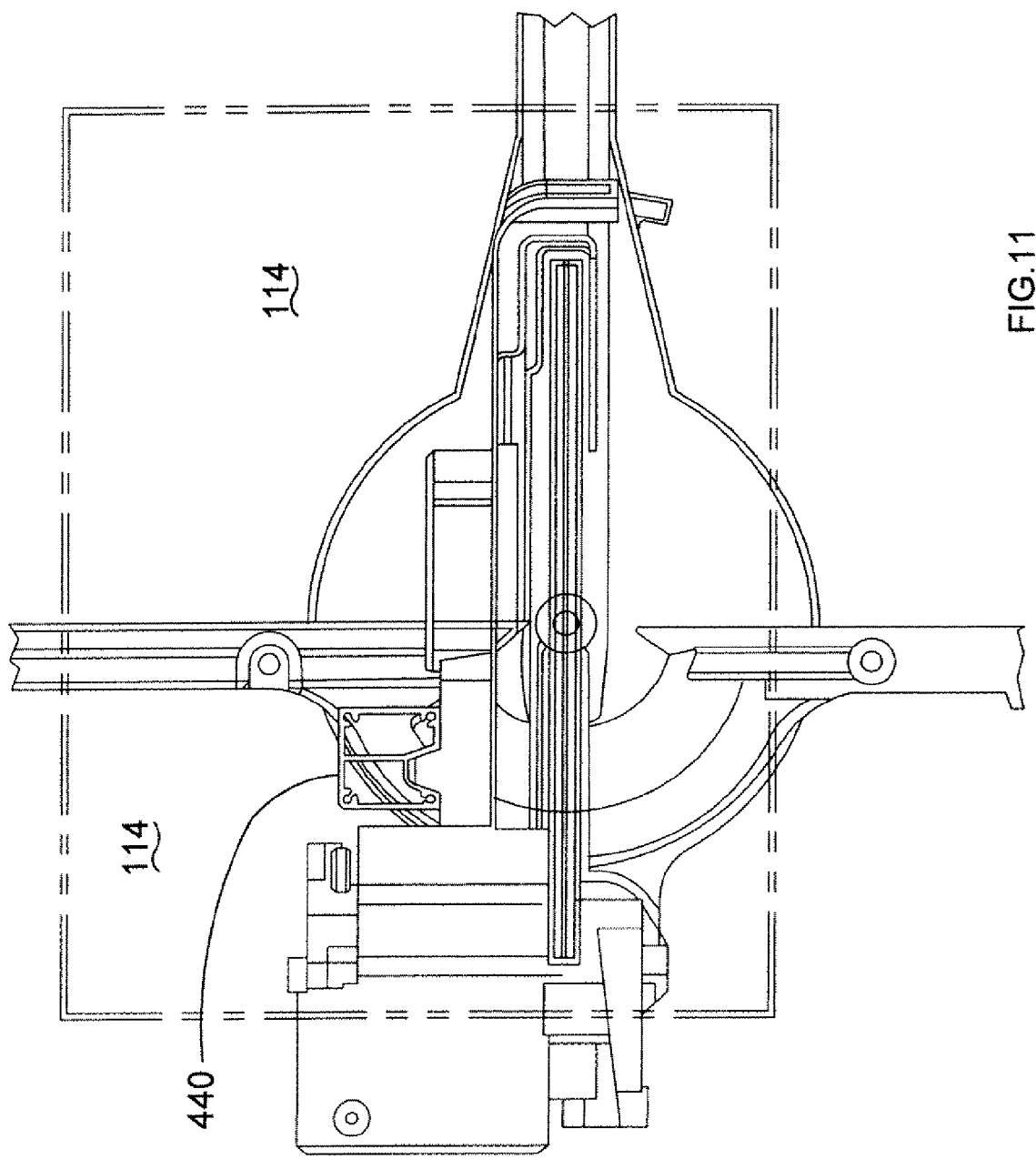

MITER SAW WITH TOP TABLE

FIELD

The present invention relates to saws, and in particular, to powered saws which can perform miter cuts, chops cuts, sliding cuts or bevel cuts, or any type of powered saw which can perform any combination of these functions.

BACKGROUND

WO98/18588 discloses a sliding compound miter saw. Such a saw can perform bevel cuts, miter cuts, sliding cuts and chop cuts. The sliding compound miter saw disclosed comprises a base 12 (using the same reference numbers as those used in WO98/18588) having a rotatable table 14 mounted within it. The rotatable table 14, in conjunction with a fence 26 fixed to the base 12, enables the sliding compound miter saw to perform miter cuts. A bevel mount 16 is connected to the rear of the table 14. The bevel mount 16 is able to pivot about a horizontal axis in relation to the table 14. The pivotal movement of the bevel mount 16 in relation to the table 14 enables the sliding compound miter saw to perform bevel cuts. Two guide rods 34 are slideably mounted onto the bevel mount 16. The rods 34 are capable of sliding horizontally, backwards and forwards. The rods 34 enable the sliding compound miter saw to perform sliding cuts. A motor unit 36 is pivotally mounted on the end of the guide rods 34. Motor unit 36 comprises a motor 22 for rotationally driving a circular saw blade 18 mounted on a drive spindle on the motor unit 36. The pivotal movement of the motor unit 36 in relation to the guide rods 34 enable the saw to perform chop cuts.

A fixed guard 40 is rigidly mounted to the motor unit 36. Fixed guard 40 surrounds the cutting edge of the top half of the cutting blade 18. Pivotal guard 42 is pivotally mounted to the motor unit. Pivotal guard 42 can pivot between a first position where it surrounds the cutting edge of the lower half of the cutting blade and a retracted position where the cutting edge of the lower half of the blade 18 is exposed for use in cutting.

The pivotal guard 42 is pivoted between its two positions using a mechanical linkage which comprises a series of mechanical arms 48, 50, which are pivotally connected to each other and the saw, and cams 52, 54 which control the movement of the arms 48, 50. As the motor unit is pivoted downwards, the mechanical linkage causes the lower cutting edge of the blade to become exposed due to the retraction of the pivotal guard by the mechanical linkage.

JP2005-178281 describes a chop saw with a table mounted on top of the motor unit.

U.S. Pat. No. 5,297,463 discloses a compound miter saw having a adjustable work piece support fence.

SUMMARY

A saw preferably includes a base assembly connected to a mounting portion, a motor unit connected to a motor support, which is pivotally mounted on the mounting portion to allow the motor unit to pivot towards or away from the base assembly to perform chop cuts. The motor unit has an output drive spindle upon which a circular saw blade can be rigidly mounted to be rotationally driven by the motor unit. At least one rearward pivotal guard is pivotally mounted on the motor unit. The pivotal guard is pivotably from a first position where it surrounds at least a portion of the lower edge of a saw blade when mounted on the spindle, to a second retracted position where the portion of the lower edge of the saw blade is exposed. The saw also has a pivotal guard actuating mechanism which moves the at least one rearward pivotal guard from its first enclosed position to its second retracted position when the motor unit is pivoted towards the base assembly.

A "forward pivotal guard", such as the second forward pivotal guard 220 and the fourth forward pivotal guard, is a blade guard which surrounds the front lower portion of the saw blade when the guard is in its enclosed position. Typically, a forward blade guard, when it moves from its retracted position, where the cutting edge of the cutting blade is exposed, to its enclosing position, where it surrounds the cutting edge of the cutting blade, it rotates, relative to the motor unit 118, in the same direction as the cutting blade when driven by the motor to perform a cutting action.

A "rearward pivotal guard", such as the third rearward pivotal guard 232, is a blade guard which surrounds the rear lower portion of the saw blade in its enclosed position. In the embodiment described herein, the rearward pivotal guard pivots in the same direction as a typical forward pivotal guard. However, the axis of pivot of the rearward pivotal guard is located rearward of the axis of rotation of the saw blade. However, it will be appreciated that such a rearward pivotal guard could pivot around the axis of rotation of the saw blade. In such a construction, when the rearward pivotal guard moves from its retracted position, where the cutting edge of the cutting blade is exposed, to its enclosing position, where it surrounds the cutting edge of the cutting blade, it typically rotates, relative to the motor unit 118, in the opposite direction to that of the cutting blade when driven by the motor to perform a cutting action.

Additional features and benefits of the present invention are described, and will be apparent from, the accompanying drawings and the detailed description below.

BRIEF DESCRIPTION OF THE DRAWINGS

Embodiments of the present invention will now be described with reference to the accompanying drawings of which:

FIG. 11 shows a top view of the saw showing the height adjustment mechanism (with the table 114 being shown as transparent);

DETAILED DESCRIPTION

The inventions described herein relate to a sliding compound miter saw, similar to that described in WO98/18588, which has a table mounted on top of the motor unit to enable the saw to act as a table saw.

Figure 1:
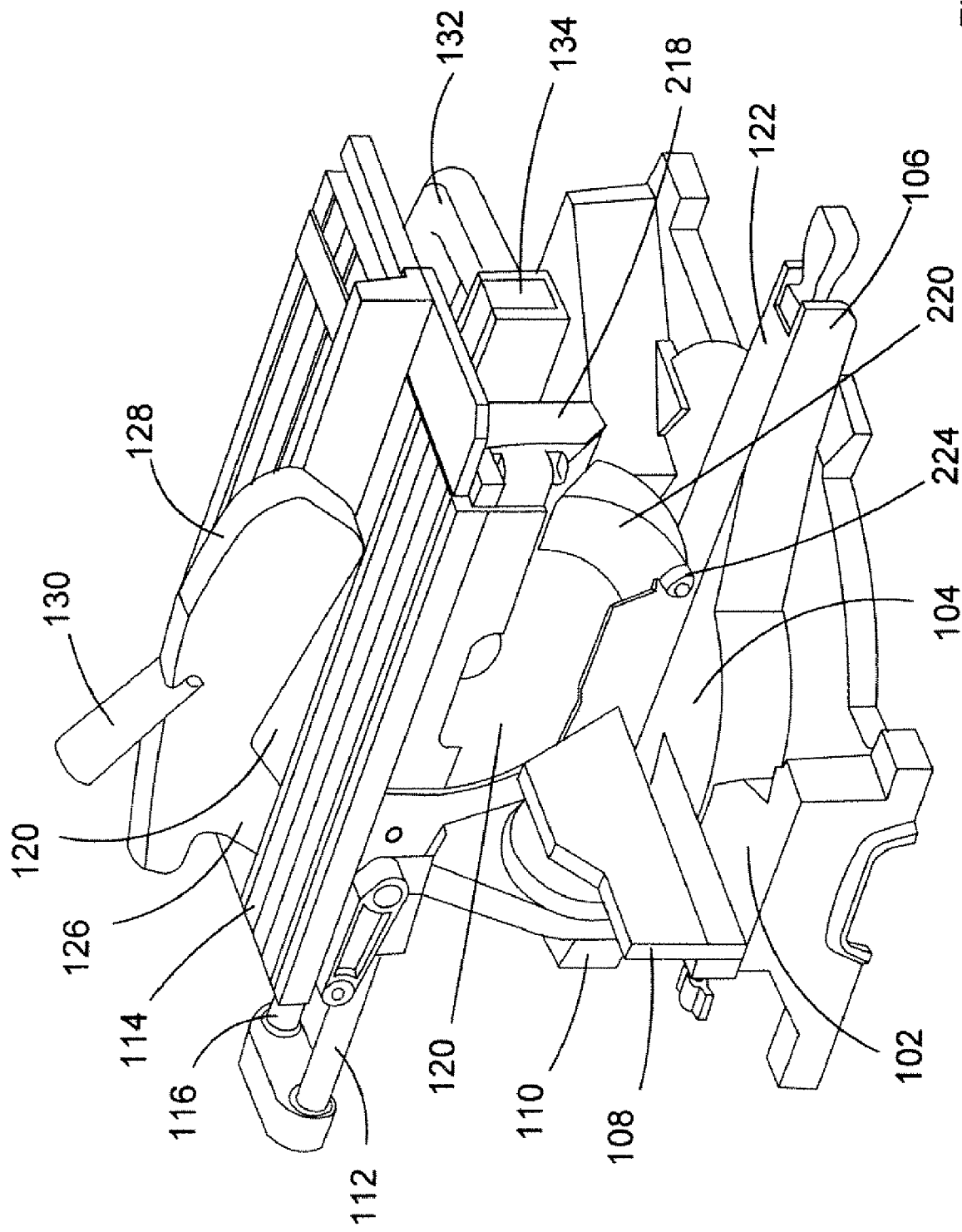
FIG. 1 shows a sliding compound miter saw with a table from a first perspective.
Figure 2:
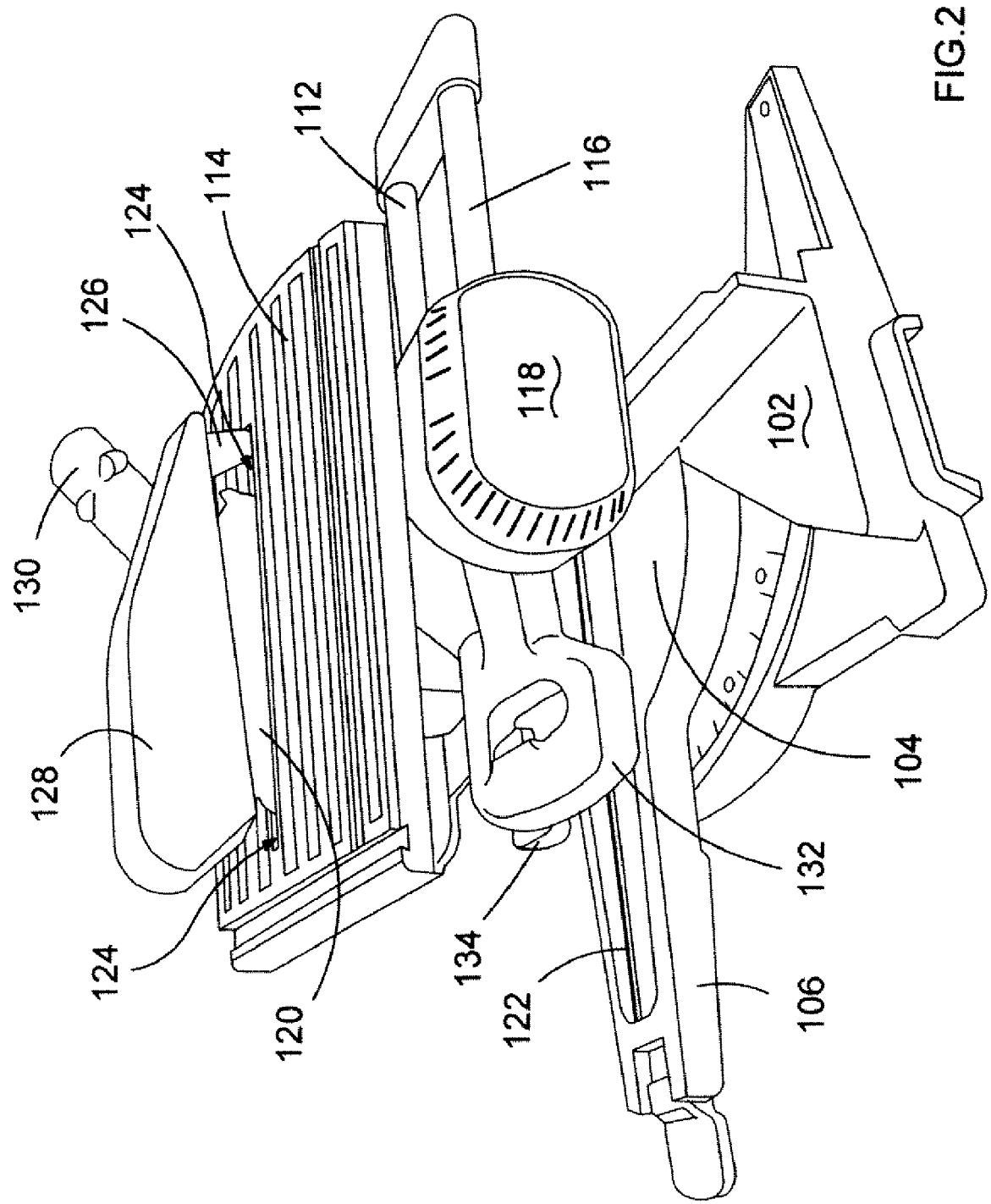
FIG. 2 shows the sliding compound miter saw with a table from a second perspective.

Referring to FIGS. 1 and 2, there is provided a sliding compound miter saw with a table 114 which can perform cuts, miter cuts, sliding cuts and chop cuts. The sliding compound miter saw disclosed comprises a base having a rotatable table 104 mounted within it. An extension arm 106 is preferably attached to the periphery of the rotatable table 104 and extends forward in well known manner. The rotatable table 104, in conjunction with a fence 108 fixed to the base 102, enables the sliding compound miter saw to perform miter cuts. A bevel mount 110 may be connected to the rear of the rotatable table 104. Bevel mount 110 is preferably able to pivot about a horizontal axis in relation to the rotatable table 104. The pivotal movement of the bevel mount 110 in relation to the rotatable table 104 enables the sliding compound miter saw to perform bevel cuts. Two guide rods 112, 116 may be slideably mounted onto the bevel mount 110. Guide rods 112, 116 are preferably capable of sliding horizontally, backwards and forwards. The guide rods 112, 116 may enable the sliding compound miter saw to perform sliding cuts. A motor unit 118 may be pivotally mounted on the end of the guide rods 112, 116. Motor unit 118, preferably comprises a motor (not shown) for rotationally driving a circular saw blade 120 mounted on a drive spindle on the motor unit 118. The pivotal movement of the motor unit 118 in relation to the guide rods 112, 116 enable the saw to perform chop cuts. The motor unit 118 is preferably biased to an upward position by a spring (not shown). A slot 122 may extend across the rotatable table 104 and along the extension arm 106.

A table 114 is preferably mounted on the top of the saw. Table 114 enables the sliding compound miter saw to be also used as a table saw. The table 114 is preferably attached to the top side of the motor unit 118. A slot 124 is formed through the table 114 through which the top section of the circular saw blade 120 projects. The motor unit 118 can be locked in a downward position such that the table 114 is horizontal. A work piece such as a piece of wood can then be slid across the top of the table 114 to engage with the top section of the saw blade 120 thus enabling the sliding compound miter saw to be used as a saw table. A riving knife 126 is preferably located towards the rear of the saw blade 120 and a guard 128 can surround the top of the saw blade 120 when the saw is not being used as a table saw, which includes a chute 130 for the extraction of wood chips.

The saw preferably comprises a plurality of guards located below the table 114 which are capable of enclosing the lower section of the saw blade when the saw is not being used as a the sliding compound miter saw for performing chop, miter, bevel or sliding cuts, for example when the saw is being used as a table saw, with the motor unit 118 locked downwardly.

Referring to FIGS. 3 to 6, a handle 132 may be attached to the motor unit 118 by which a user can grip and pivot the motor unit 118 and the circular saw blade 120 downwards towards the rotatable table 104. An electric switch 134 is preferably mounted on the handle 132 for activating the motor.

The motor unit 118 can be locked in its lowest pivotal position (FIG. 3) against the biasing force of the spring. When the motor unit 118 is in this position, the table 114 is horizontal. In this position the table 114 can be used as a table saw, the work piece 216 being cut by the part of the saw blade 120 which passes through the slot 124.

When the motor unit 118 is free to pivot, the saw can be used as a sliding compound miter saw in the normal manner.

The height of the table 114, and hence the amount of saw blade 120 passing through it can be adjusted vertically. This is described in more detail further below.

The lower part of the circular saw blade 120 below the table 114 is surrounded by a guard actuation assembly. A first embodiment of such a guard actuation assembly which will now be described in more detail.

A first fixed guard 218 may be attached to the motor unit 118. First fixed guard 218 preferably surrounds top and middle sections of the circular saw blade 120. A "fixed guard", such as the first fixed guard, is a blade guard which remains stationary relative to the motor unit 118.

Figure 3:
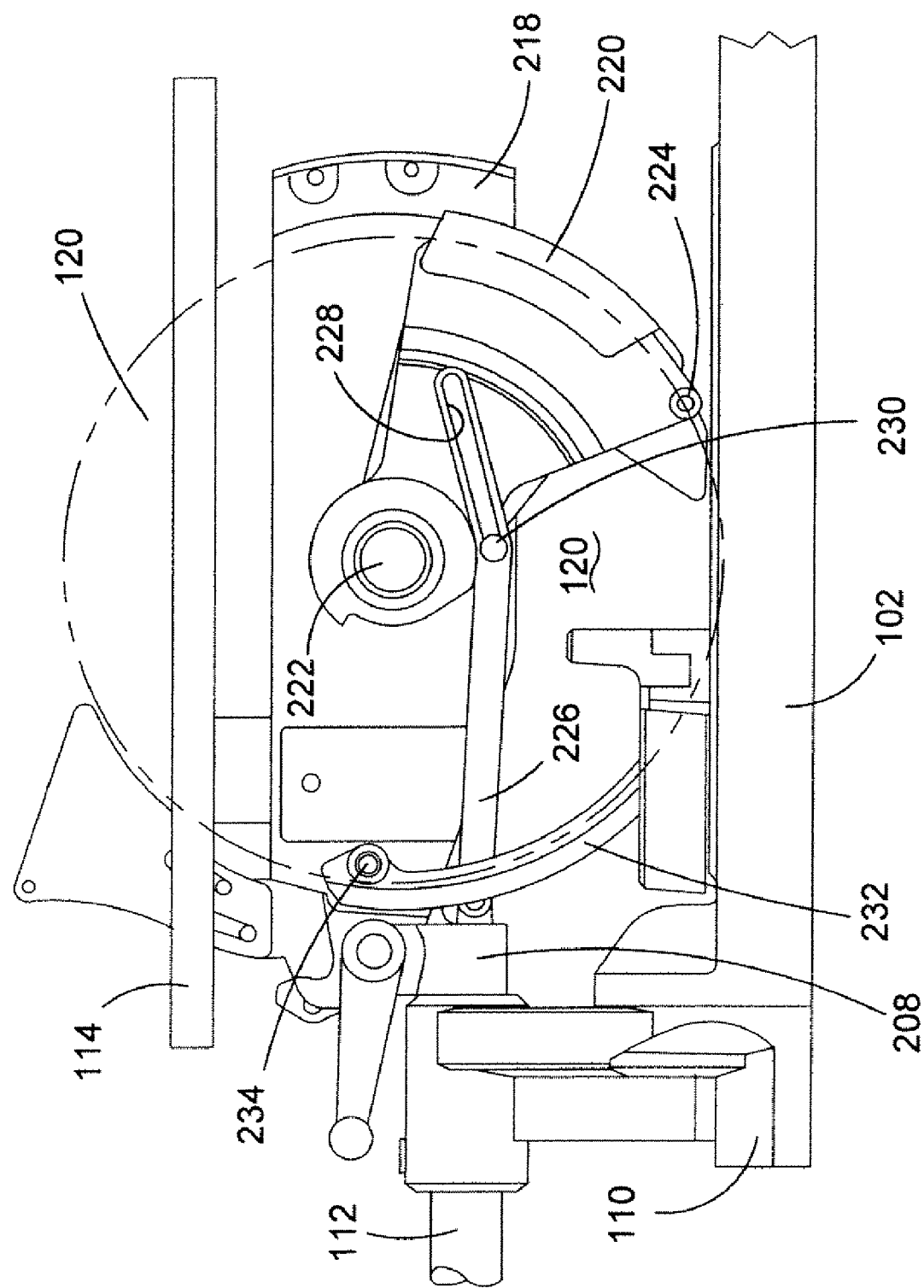
FIG. 3 shows a side view of the saw showing the first embodiment of the guard actuation mechanism and the mechanical linkage which automatically moves the pivotal guards.
Figure 4:
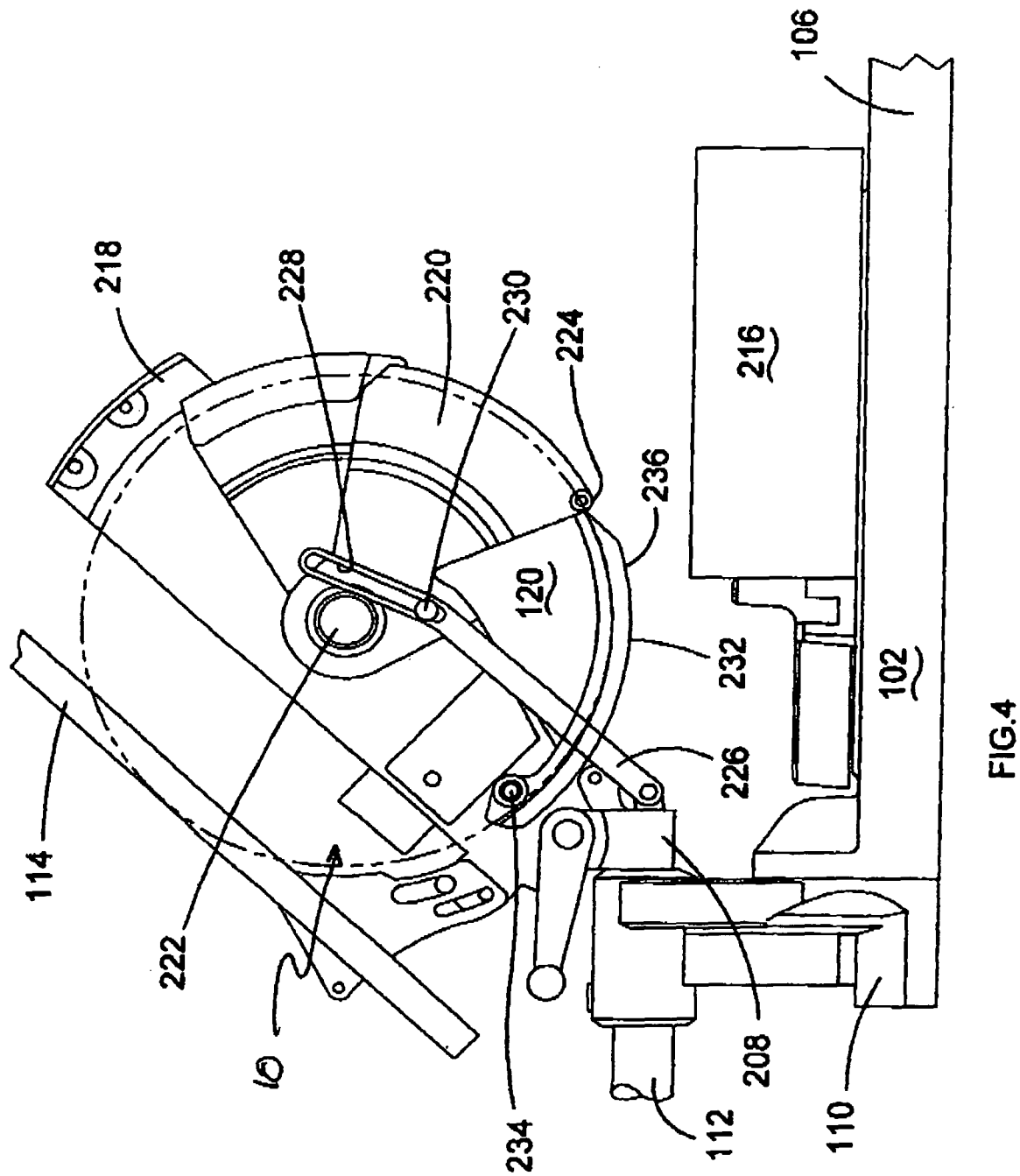
FIG. 4 shows a side view of the saw with the blade at its maximum height.

A second forward pivotal guard 220 may be pivotally attached to the first fixed guard 218. The second forward pivotal guard 220 preferably pivots about the axis 222 of the circular saw blade 120. A spring (not shown) may bias the second forward pivotal guard 220 downward (clockwise) as shown in FIG. 3. A roller 224 is preferably mounted on the base of the guard 220. The roller 224 may engage either the rotary table 104 or extension 106 or a work piece 216 mounted on the support table 104 or extension 106.

A bar 226 is preferably pivotally attached at one end to a motor support 208 attached to the end of the guide rails 112, 116. An elongate slot 228 may be formed along a section of the length of the bar 226 at the other end. A pin 230, which is preferably rigidly attached to the second forward pivotal guard 220, passes through the slot 228 and which is capable of sliding along the slot 228. The biasing spring acting on the second forward pivotal guard 220 causes the guard to pivot until the pin 230 is at the inner end position of the slot where it remains held by the force of the spring. The pin 230 located within the slot 228 of the bar 226 controls the pivotal movement of the second guard 220 on the housing as it pivots upwards and downwards. When the housing 10 is in its upper most pivotal position (FIG. 4), the second forward pivotal guard 220 surrounds the lower front section of circular saw blade 120. As the motor unit 118 is pivoted downwardly, the bar 226 pushes the pin 230, causing the second forward pivotal guard 220 to telescopically pivot into the first fixed guard 218. The slot 228 allows the guard 220 to pivot freely, against the biasing force of the spring if it encounters a work piece 216 located on the support table 104.

A third rearward pivotal guard 232 is preferably pivotally mounted about a point 234 on the rear of the first fixed guard 218.

A spring (not shown) may bias the third rearward pivotal guard 232 backwards (clockwise) as shown in FIG. 3. A slot (not visible) is preferably formed centrally along the length of the guard 232. When the motor unit 118 is pivoted to its uppermost position (FIG. 4), the third rearward pivotal guard 232 preferably pivots to a maximum rearward (clockwise) position where it surrounds the rear of the circular saw blade 120. When the motor unit 118 is pivoted downwardly, the front tip 236 of the third rearward pivotal guard 232 preferably engages with either the support table 104 or a work piece 216 on the support table 104. Once the front tip 236 is engaged, pivotal downward movement causes the front tip 236 to slide forward, rotating the third rearward pivotal guard 232 about its axis 234 anti-clockwise, the edge of the cutting blade 120 passing through the slot in the third rearward pivotal guard 232 and allowing it to contact a work piece 16 to cut.

When the housing is raised to its upper pivot point (FIG. 4), the front tip 236 of the third rearward pivotal guard 232 and the rear lower end of the second forward pivotal guard 220 preferably meet so that the whole of the lower section of the cutting blade 120 is surrounded. This, in combination with the fixed guard 218, ensures the whole of the blade 120 surrounded when the motor unit 118 is in the upper position.

Figure 5:
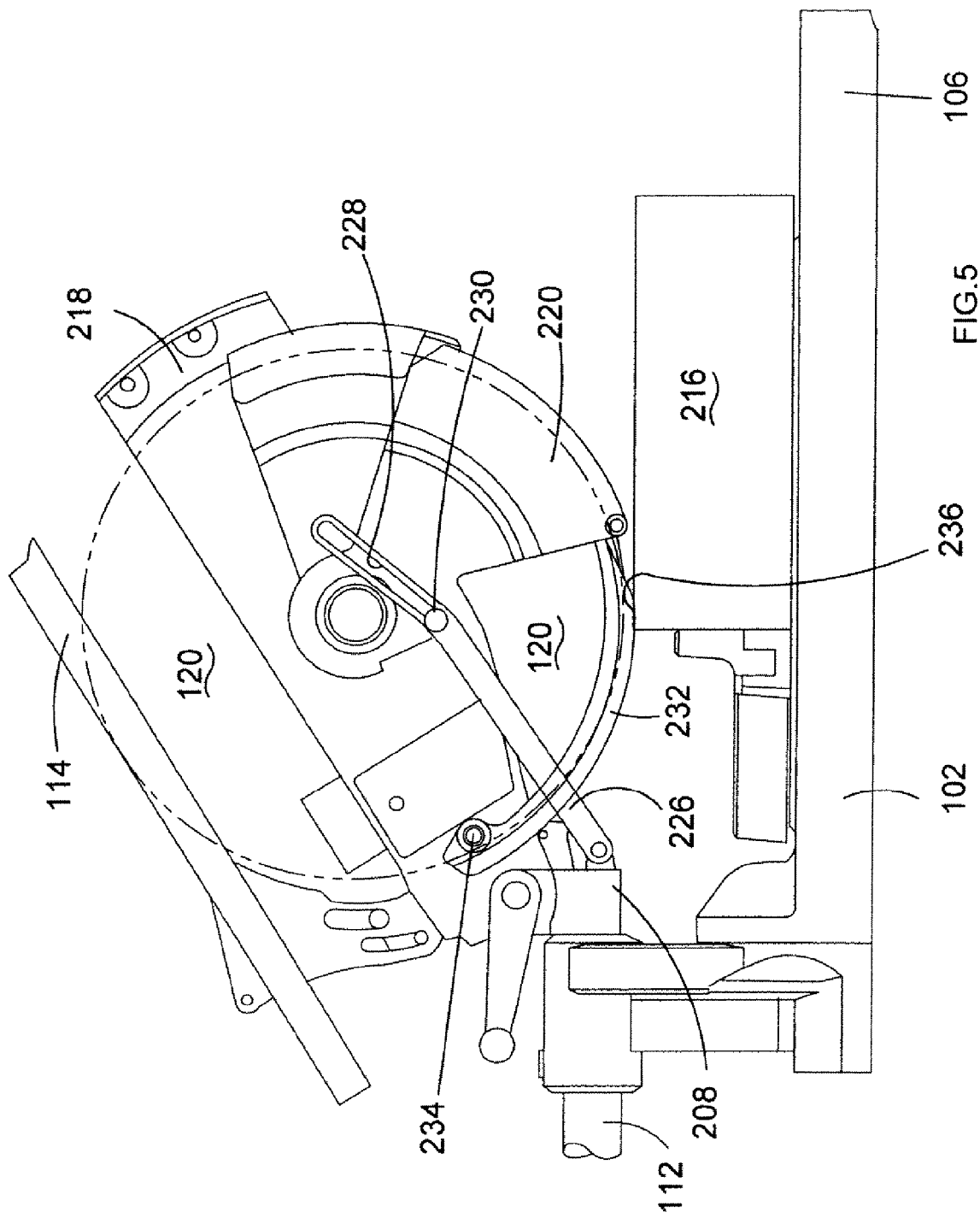
FIG. 5 shows a side view of the saw with the blade touching a work piece.

When the motor unit 118 is pivoted downwardly, the second forward pivotal guard 220 is preferably moved anti-clockwise as shown in FIG. 5, against the biasing force of the spring, by the pin 230 located in the inner end position of the elongate slot 228 of the bar 226. The second forward pivotal guard 220 pivots, as the motor unit 118 is pivotally lowered, under the control of the bar 226, until the roller 224 engages the work piece 216 (see FIG. 6). As the motor unit 118 continues to pivot downwardly, the roller 224 preferably rolls over the top surface of the work piece 216, causing the second forward pivotal guard 220 to pivot at a different rate which would otherwise be caused by the bar 226, resulting in the pin 230 sliding along the elongate slot 228 towards the end located remotely from the bar's pivot point. Thus the front lower section of the saw blade 120 becomes exposed to allow it to cut the work piece 216.

Figure 6:
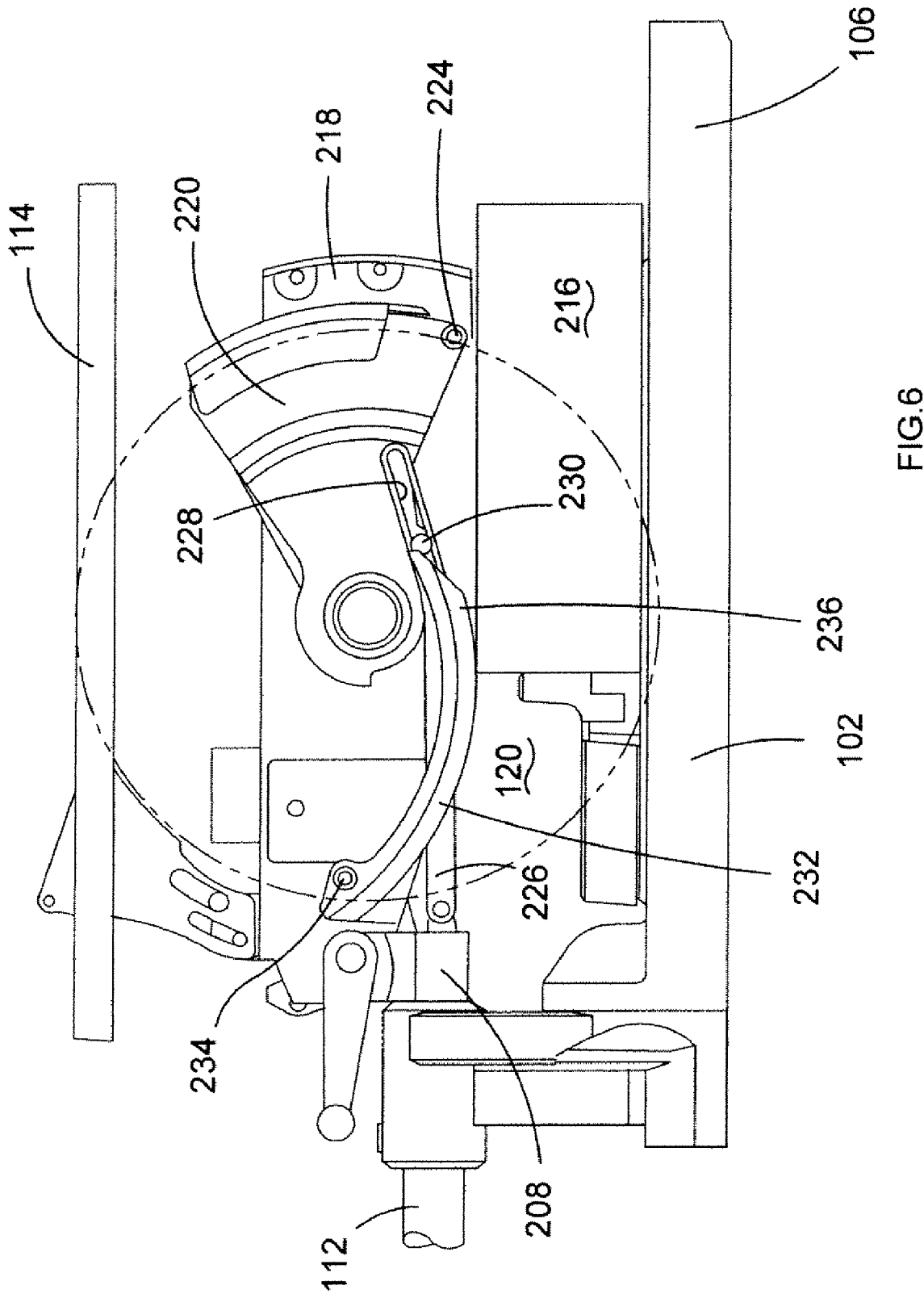
FIG. 6 shows a side view of the saw with the blade cutting the work piece.

Similarly, the third rearward pivotal guard 232 preferably pivots once the tip 236 has engaged, allowing the edge of the blade 120 to pass through the third rearward pivotal guard 232, thus exposing the rear lower section of the blade 120 to cut the work piece 216 (see FIG. 6).

A second embodiment of such a guard assembly which will now be described in more detail. Where the same features are present in the second embodiment which are present in the first embodiment, the same reference numbers have been used. The second embodiment is the same as the first except the different mechanism for moving the third rearward pivotal guard 232, and an additional fourth forward pivotal guard 320.

The second forward pivotal guard 220 is preferably moved as described previously for the first embodiment. The second forward pivotal guard is preferably moved using the bar 226 via the pin 230 located within the slot 228. However, unlike the first embodiment, there is now an additional fourth forward pivotal guard 320 pivotally mounted about the aperture 324, the wall of which surrounds the drive spindle of the motor unit 118, and into which the second forward pivotal guard can telescope, and which in turn can telescope into the fixed guard 218. The guard 320 can freely pivot into and out of, in a telescopic manner, the first fixed guard 218 (see FIG. 17 to 21). FIG. 16A to 16E show design drawings of the fourth forward pivotal guard 320. The fourth forward pivotal guard 320 is prevented from completely pivoting out of the fixed guard 218 by a catch formed on the fourth forward pivotal guard 320.

Figures 15A, 15B:
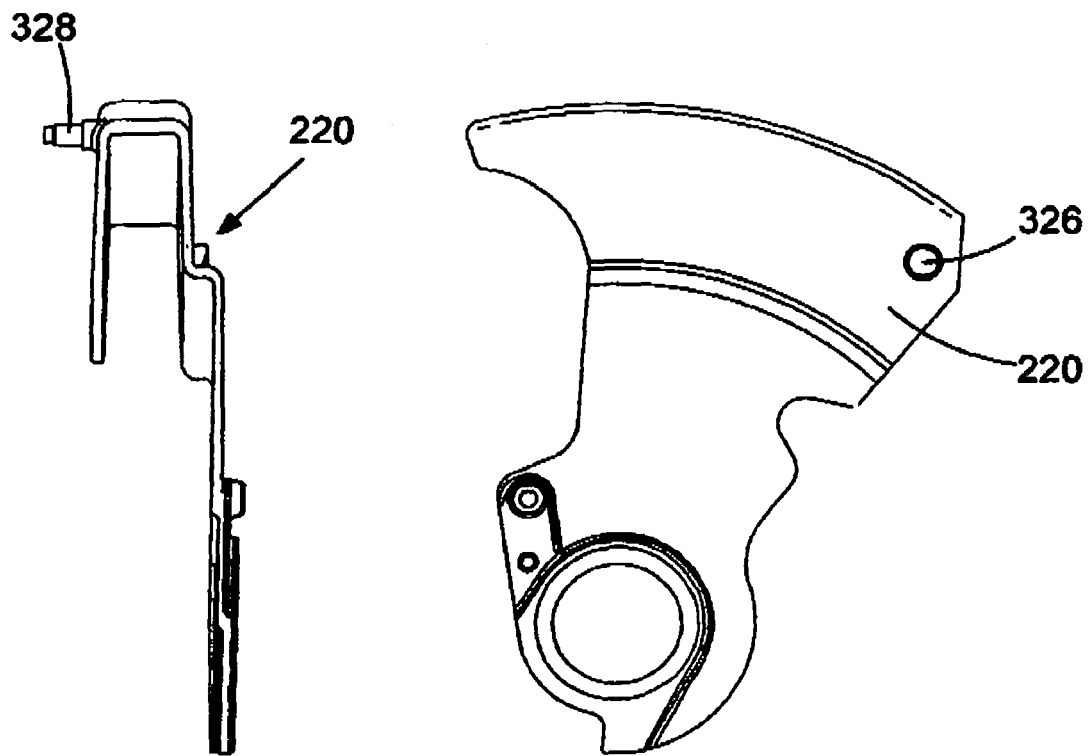
FIGS. 15A and 15B show the second forward pivotal guard 220 of the of the second embodiment of the guard actuation mechanism.
Figure 16A:
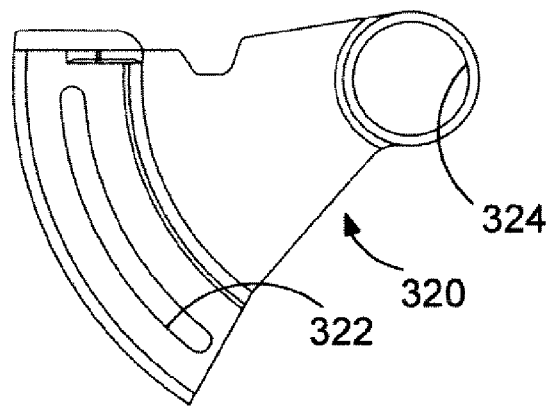
FIGS. 16A to 16E show the fourth forward pivotal guard of the second embodiment of the guard actuation mechanism.
Figure 16B:
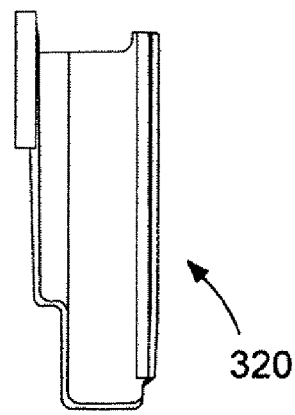
Figure 16C:
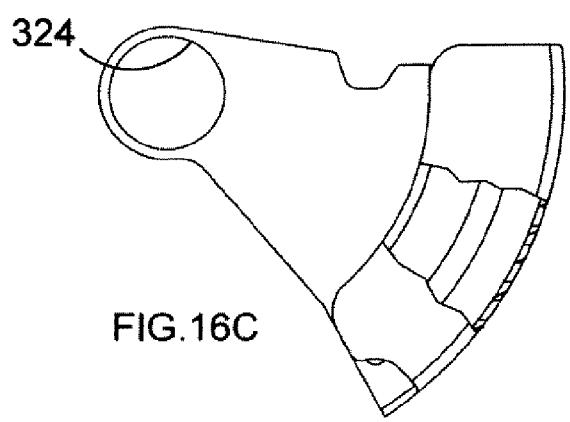
Figure 16D:
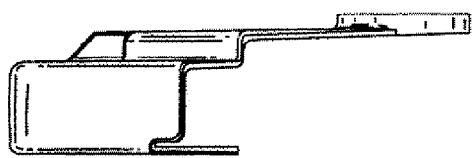
Figure 16E:
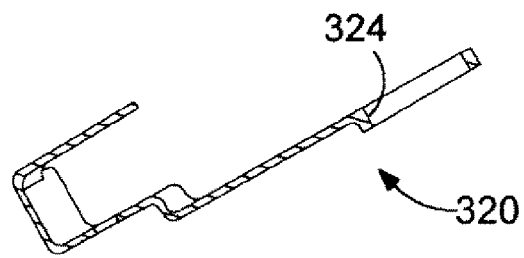
Figure 17:
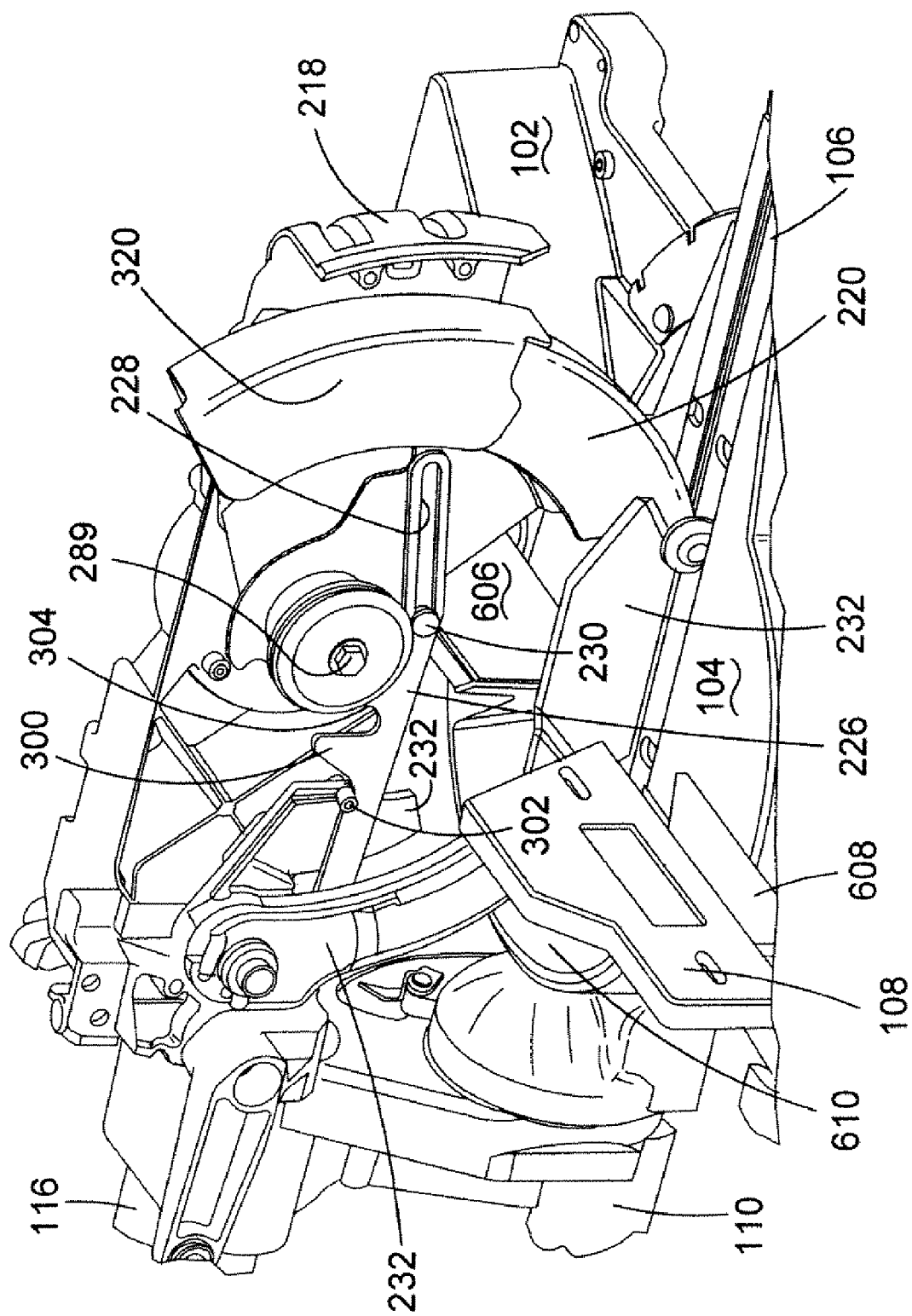
FIG. 17 shows a perspective view showing the second embodiment of the guard actuation mechanism.
Figure 18:
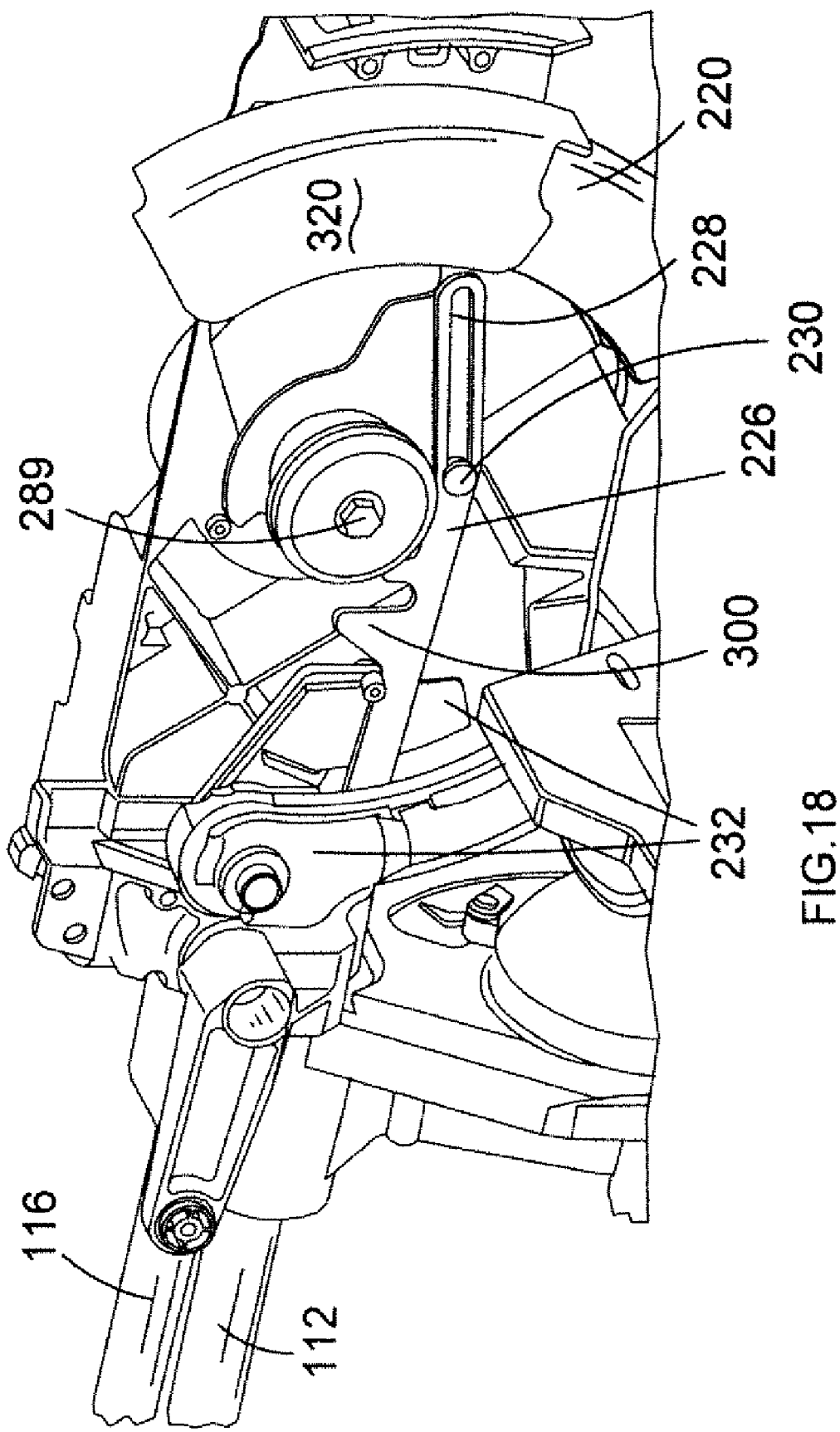
FIG. 18 shows a perspective view showing the second embodiment of the guard actuation mechanism.
Figure 19:
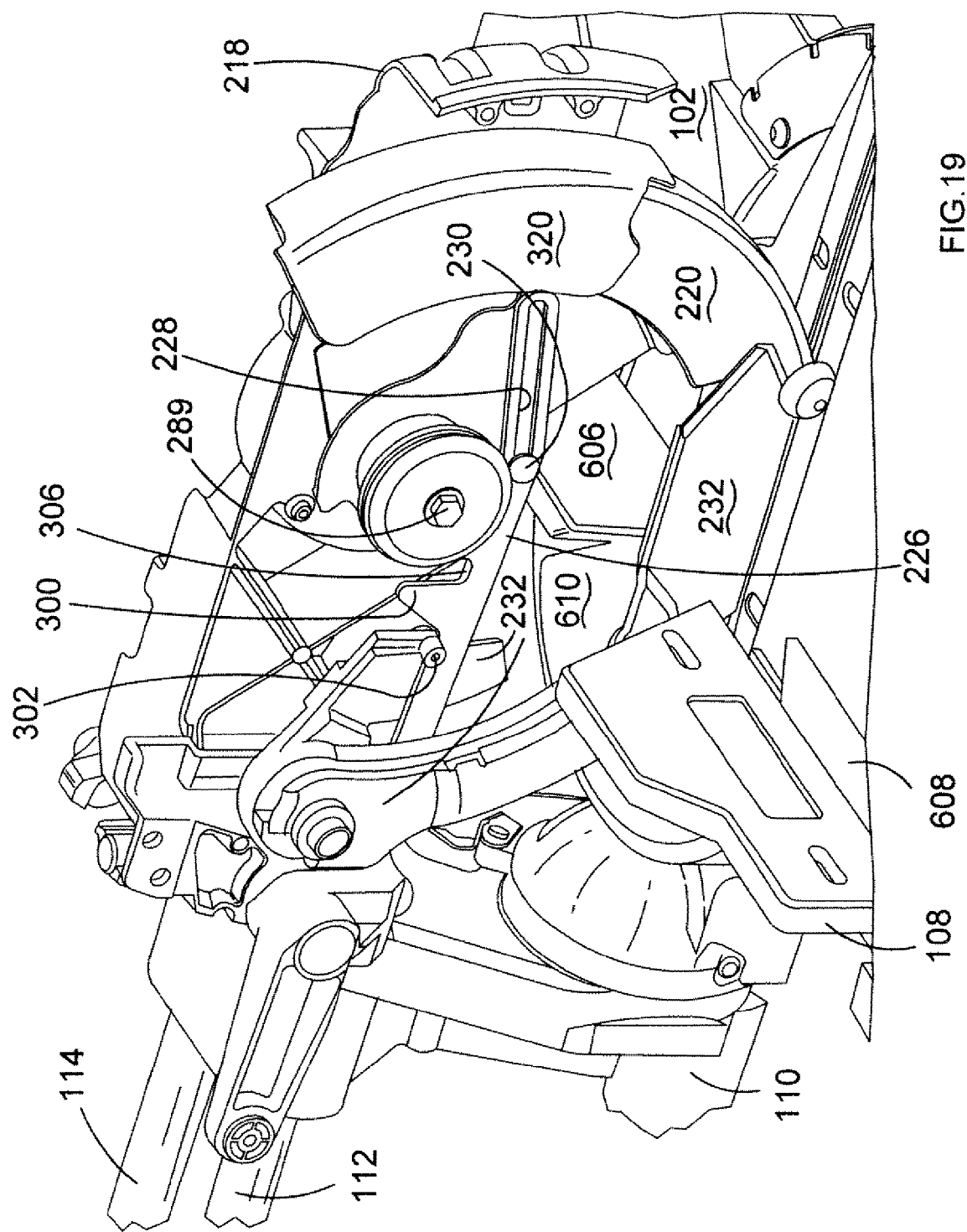
FIG. 19 shows a perspective view showing the second embodiment of the guard actuation mechanism.
Figure 20:
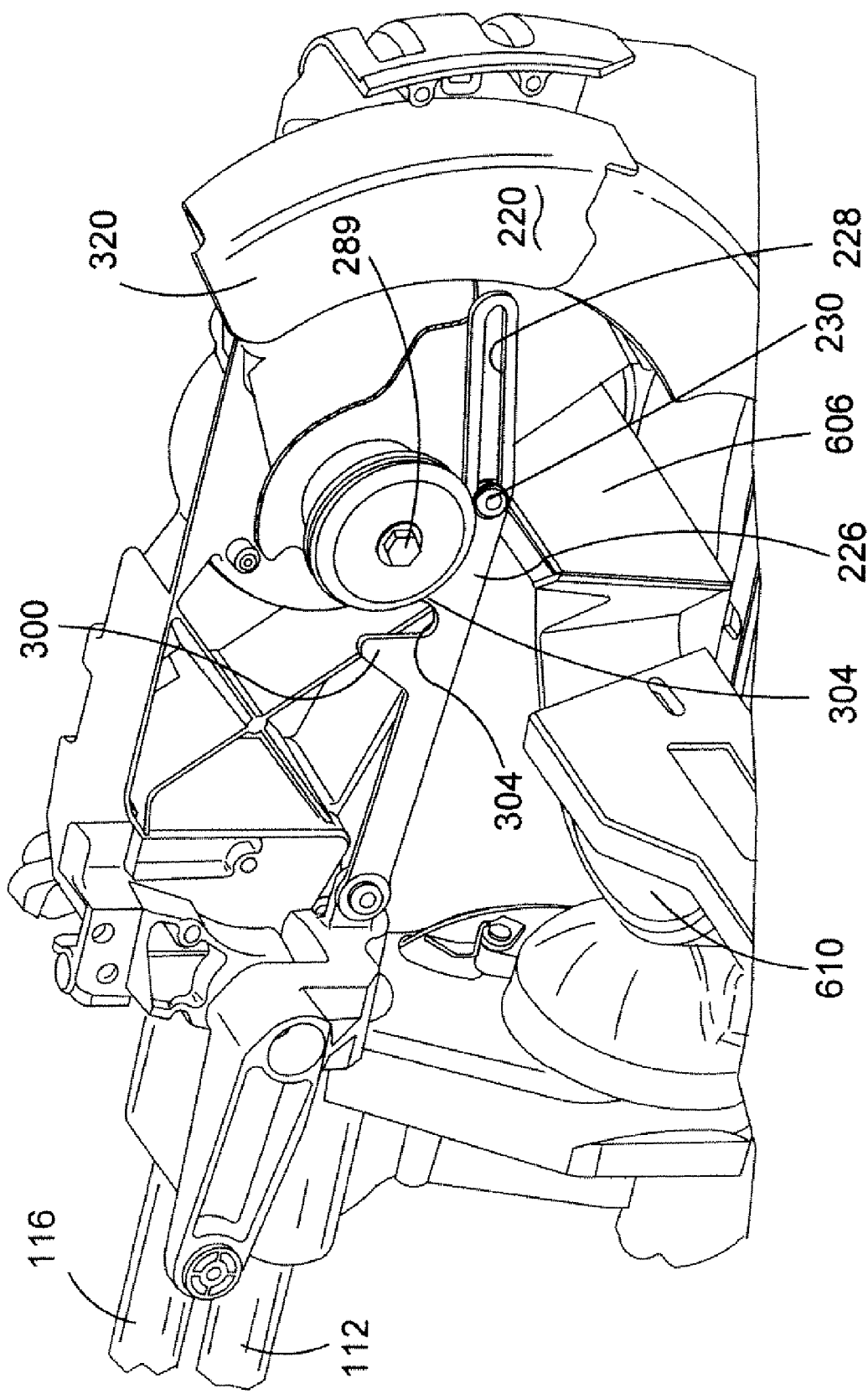
FIG. 20 shows a perspective view showing the second embodiment of the guard actuation mechanism.
Figure 21:
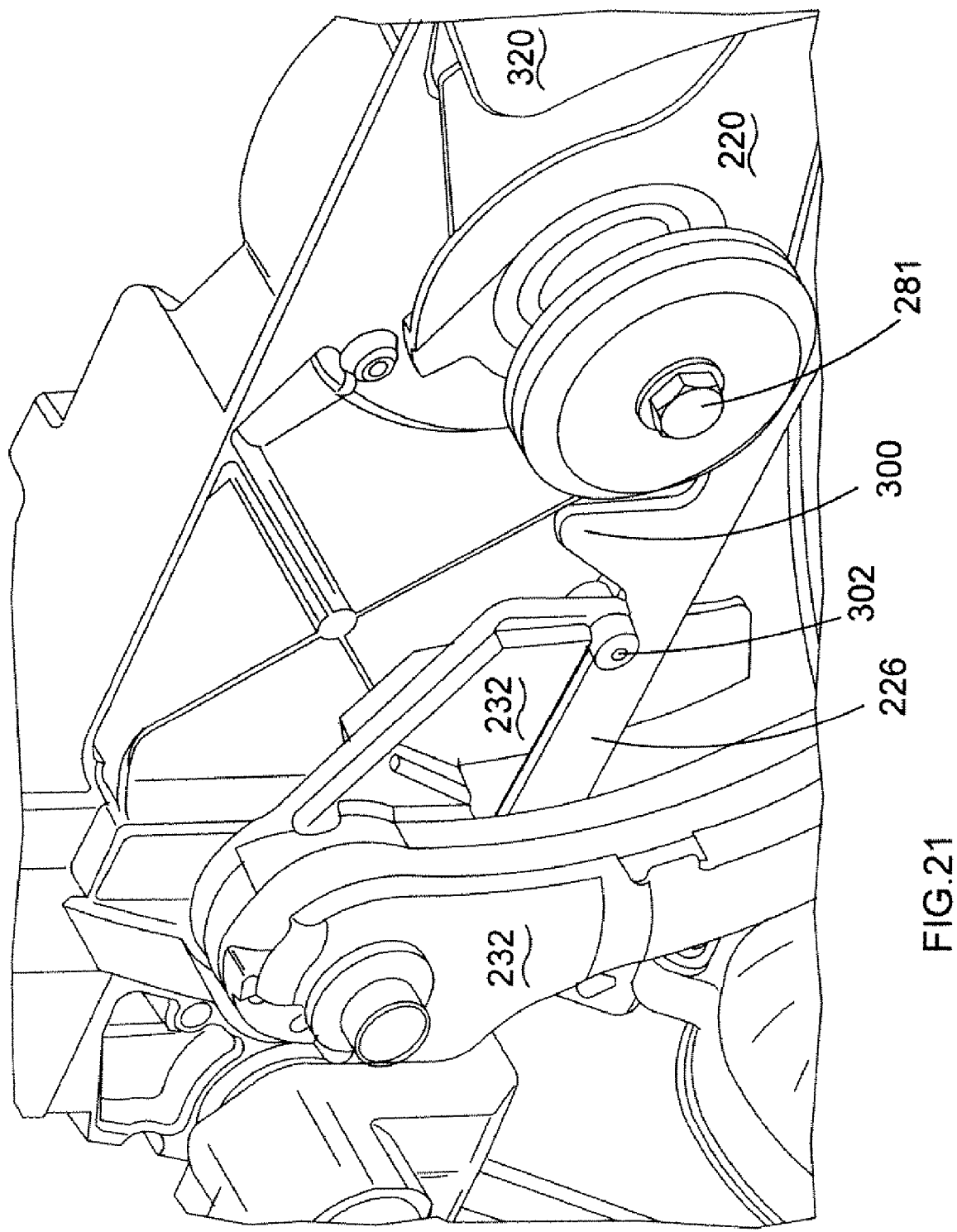
FIG. 21 shows a perspective view showing the second embodiment of the guard actuation mechanism.

A slot 322 is preferably formed through the side of the fourth forward pivotal guard 320. FIG. 15A and 15B show the second forward pivotal guard 220. A screw preferably attaches at point 326 on the second forward pivotal guard 220, the body of which passes through the slot 322. As the second forward pivotal guard pivots, due to the pivoting movement of the motor unit 118 which causes the second forward pivotal guard to pivot due to the bar 226, the screw at point 326, which initially is located at the lowest point within the slot 322, slides along the slot 322 of the fourth forward pivotal guard 320 until it reaches the top end of the slot 322. At which point, the pivotal movement of the second forward pivotal guard 220, which is now located within the fourth forward pivotal guard 320 in a telescopic fashion, causes pivotal movement of the fourth forward pivotal guard 320. The two guards 220, 320 pivotally move in unison inside the fixed guard 218 until the two guards located inside of the fixed guard.

The roller 224 mounts on the peg 328 of the guard 220 as shown in FIG. 15A.

In the first embodiment, the third rearward pivotal guard 232 moved when it engaged with a work piece, as the housing is pivoted downwardly. However, it has been found that this restricts the visibility of the operator during the use of such a design. It is therefore proposed to move the third rearward pivotal guard using a cam system.

FIGS. 8A to 8E show the inner half of the third rearward pivotal guard of the second embodiment; FIGS. 9A to 9D show the outer half of the third rearward pivotal guard of the second embodiment. The two are clamped together to form the guard 232 shown in FIG. 17 to 21.

A cam 300 is preferably formed on the bar 226, which is used to pivot the second forward pivotal guard 220 (see FIGS. 7, 17 to 21). A cam follower 302, in the form of a roller bearing, is preferably mounted on the third rearward pivotal guard 232 at point 350 and which engages with the cam 300. A stop 304 may be formed next to the cam 300, creating a slot 306 between them in which the cam follower 302 sits when the motor unit 118 is in its uppermost position. The shape of the slot 306 is such that, when the housing is in its raised position, the cam follower 302 is prevented from moving, thus locking the third rearward pivotal guard 232 against any pivotal movement.

Figure 7:
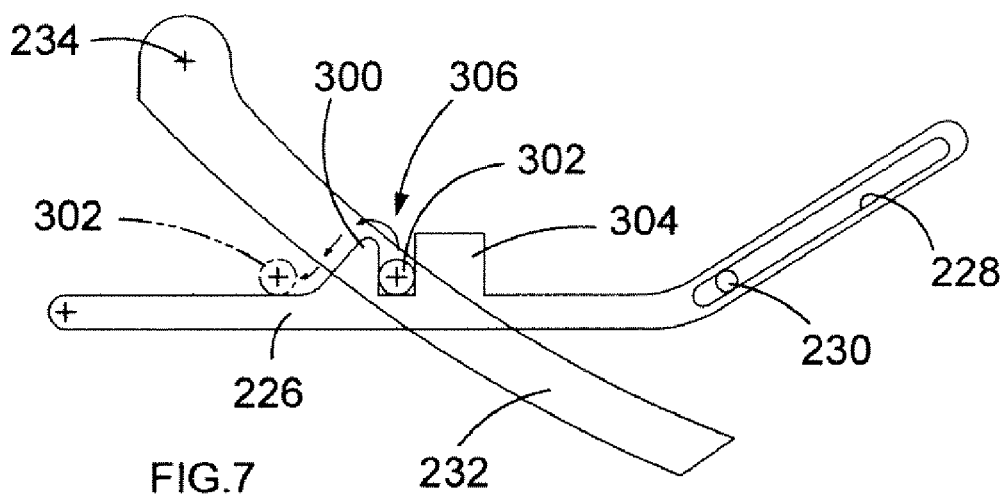
FIG. 7 shows a cam mechanism of the second embodiment of the guard actuation mechanism.
Figures 8A, 8B, 8C, 8D:
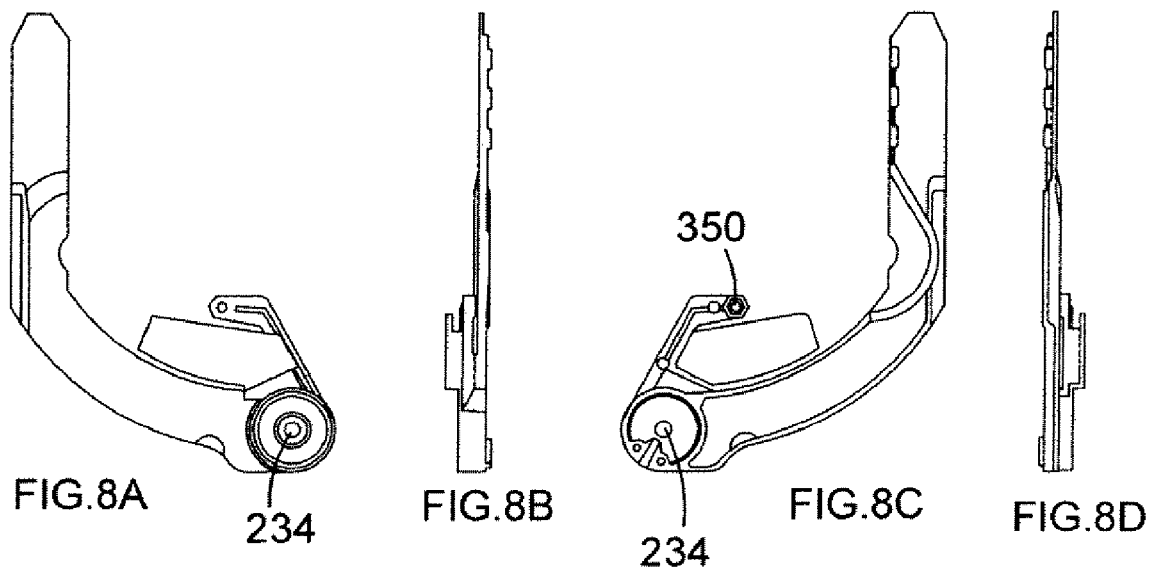
FIGS. 8A to 8E show a diagram of the inner half of the third rearward pivotal guard of the second embodiment of the guard actuation mechanism.
Figure 8E:
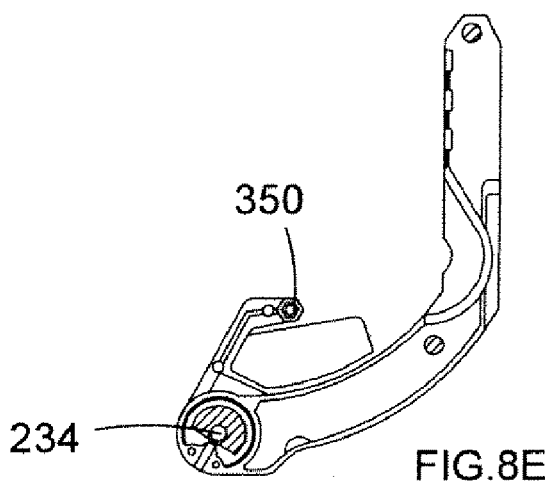
Figure 9D:
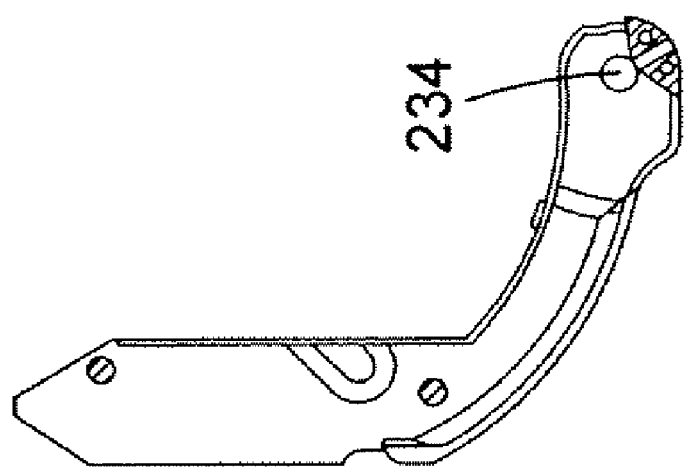
FIGS. 9A to 9D show a diagram of the outer half of the third rearward pivotal guard of the second embodiment of the guard actuation mechanism.
Figure 9C:
Figure 9B:
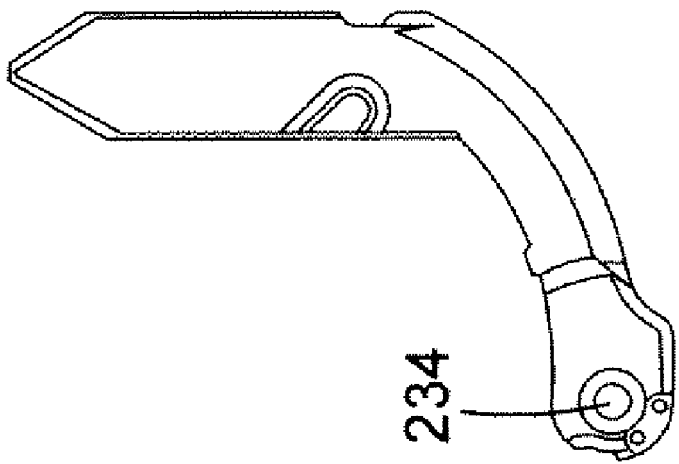
Figure 9A:

As the motor unit 118 is pivoted downwardly causing the bar 226 to move, the cam follower 302 rides out of the slot 306 and over the cam 300 in a direction shown by the arrows in FIG. 7. When the motor unit 118 is in its lowest position, the cam follower 302 is in the position indicated by the dashed lines in FIG. 7. The shape of the cam 300 is such to cause the third rearward pivotal guard 232 to initially rise to expose the edge of the blade (to aid visibility) and then fall to engage with the work piece as in the embodiment.

When the motor unit 118 rises, the cam 302, retraces its path over the cam 300 on bar 226, closing the third rearward pivotal guard 232. The end of the drive spindle of the motor unit 118 is shown as reference number 289 in FIG. 17 to 21.

The first embodiment of height adjustment mechanism will now be described with reference to FIGS. 10, 11 and 12.

The table 114 is preferably moveably mounted on the motor unit 118 using a tubular support 440. The tubular support 440 allows the table 114 to slide up and down on the motor unit 118.

Figure 10:
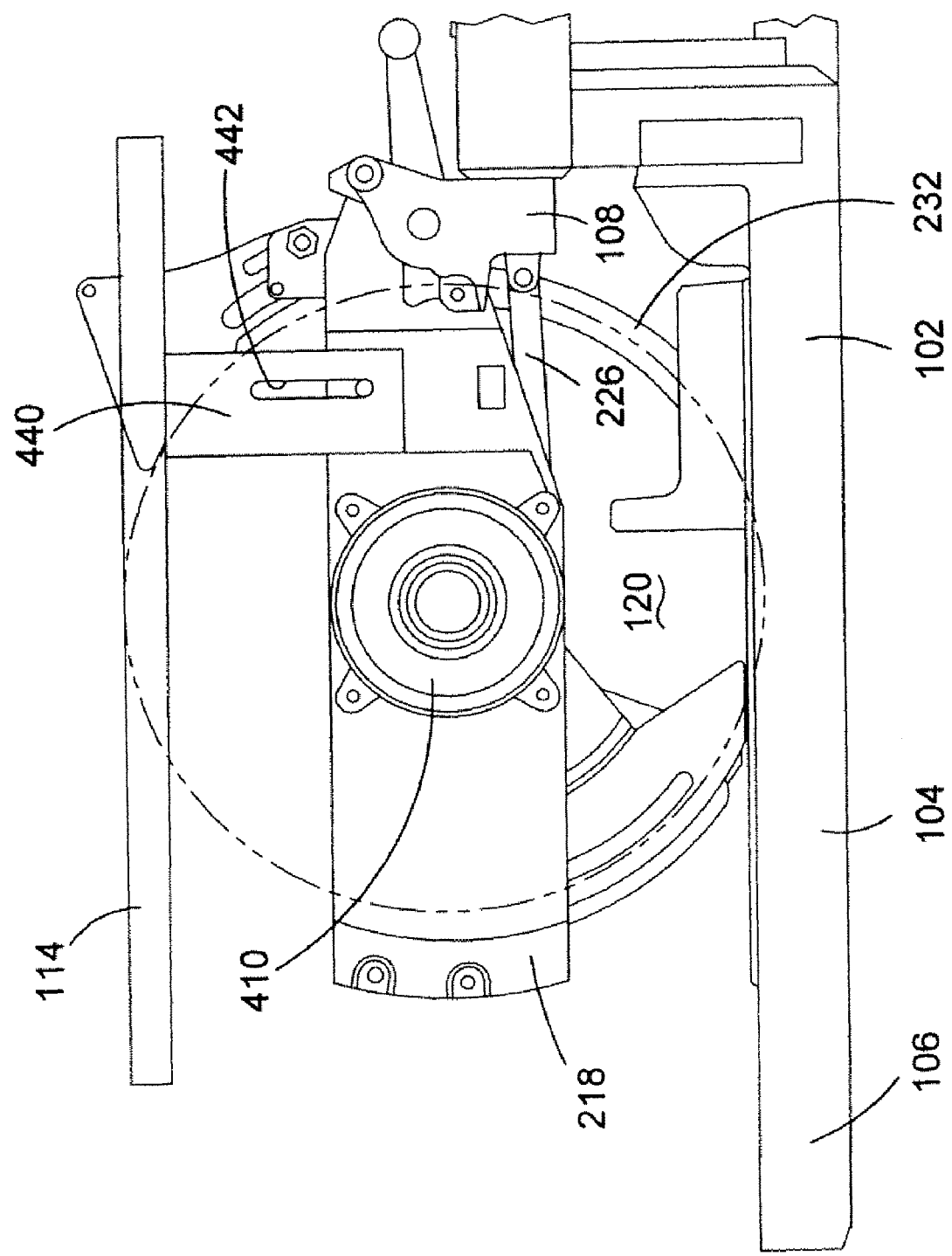
FIG. 10 shows a side view of the saw (with the first embodiment of the guard actuating mechanism) with a first embodiment of the table height adjustment mechanism.
Figure 12A:
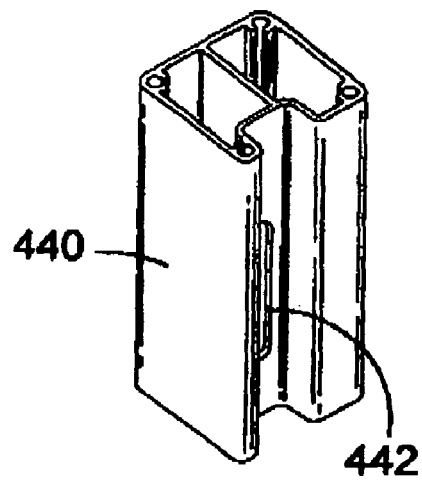
FIGS. 12A and 12B are perspective views of the tubular support.
Figure 12B:
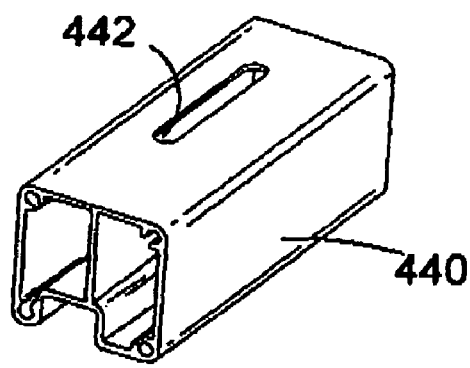

Referring to FIG. 10, a tubular support 440 is preferably attached to the edge of the table 114. The longitudinal axis of the support 440 is preferably vertical. The shape of the cross section of tube 440 is preferably rectangular as best seen in FIGS. 12A and 12B. Two vertical slots 442 (only one is visible in FIG. 10) may be formed on opposite sides of the tubular support 440 in a corresponding manner. A threaded hole is preferably formed in the metal casting which forms the housing 410 of the motor unit 118. A bolt may pass through the two slots 442, passing through the width of the tubular support 440 and is preferably threadedly engaged in the hole in the casting of the housing 410. The head of the bolt should be sufficiently large to prevent it passing through the slots 442.

When the bolt is screwed into the threaded hole, it preferably sandwiches the tubular support 440 against the casting 9 as the head of the bolt cannot pass through the slots 442) and prevents it being able to slide in a vertical manner. In order to raise the height of the table 114 above the housing 410, the bolt is unscrewed slightly, so that the tubular support 440 can slide vertically, the sliding movement of the bolt along the elongate slot 442 controlling the movement of the tubular support 440. The height is then adjusted and then the bolt tightened to hold the tubular support 440, and hence table 114, stationary.

A second embodiment of the height adjustment mechanism is now described with reference to FIG. 13. Where the same features are present in the second embodiment which were present in the first, the same reference numbers have been used.

The design remains substantially the same. However, the bolt has been replaced by a threaded bar 400 which preferably screws into the metal cast of the housing 410 and a locking knob assembly (described below) which preferably screws onto the threaded bar 400 to sandwich the tubular support 440 against the cast of the housing 410. The purpose is to prevent the vertical tubular support 440 from unnecessary movement during height adjustment.

Figure 13:
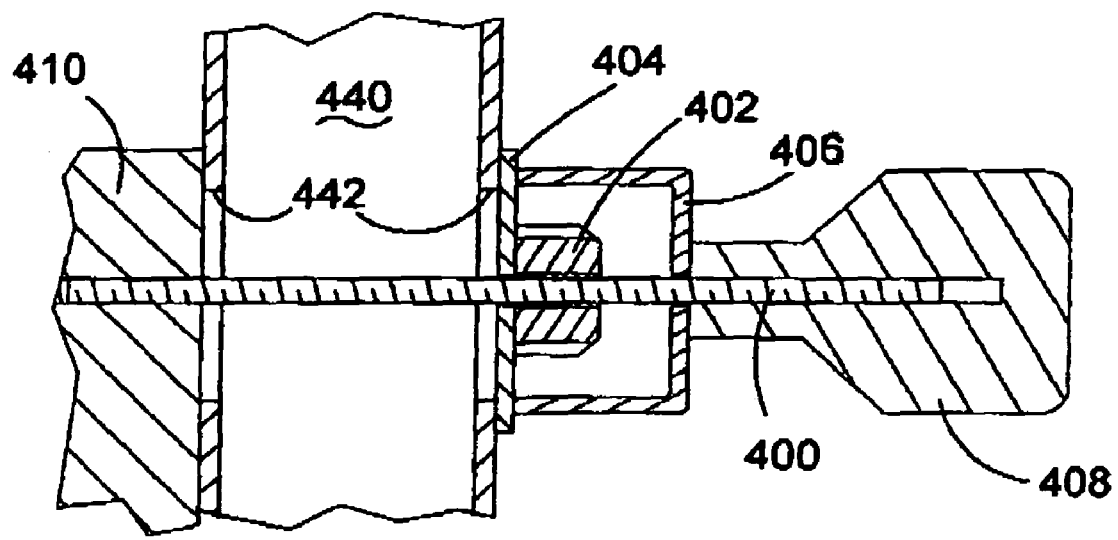
FIG. 13 shows a cross-sectional view of the locking mechanism for the second embodiment of the height adjustment mechanism.

FIG. 13 shows a horizontal cross section of the threaded bar 400 and support 440.

The assembly preferably comprises a self-locking nut 402 (with nylon insert) being screwed onto the threaded bar 100, which is screwed into the metal cast 410. The threaded bar 100 may pass through vertical slots 442 in the vertical tubular support 440. The nut 402 is preferably screwed onto the bar 400 sandwiching a washer 404 between the nut 402 and the vertical support 440. The nut 402 is tightened to apply a predetermined compression force onto the vertical support 440. This allows the support 440 limited movement. A cup shaped washer 406 preferably surrounds, but does not engage with the nut 402 which abuts against the washer 404. A knob 408 is then screwed onto the threaded shaft 400 to sandwich the cup shaped washer 406 against the washer 404. Tightening of the knob 408 results in the vertical support 440 being against the side of the cast 410 to fix its position. The slackening of the knob 408 releases the support 440 and allows it to slide. However, the self-locking nut 402 prevents excessive movement of the support 440.

Figure 14:
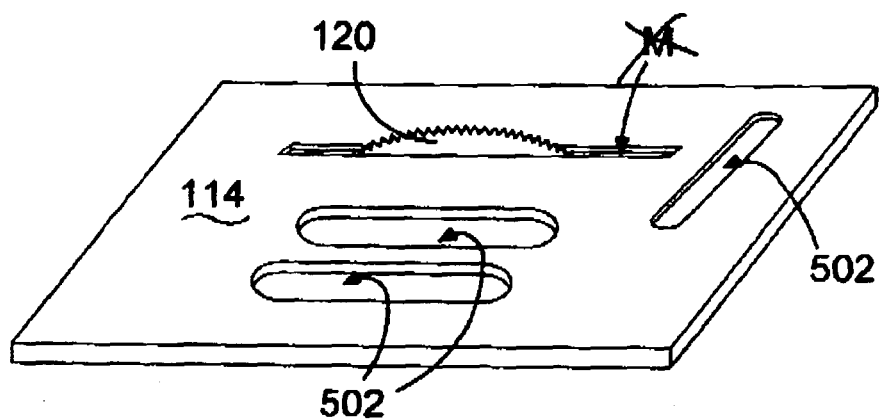
FIG. 14 shows a partial perspective view of the table.

Referring to FIG. 14, table 114 preferably have a plurality of slots 502. The slots 502 enable the user to see through the table 114. The purpose of the slots is to assist the user when they are using the saw as a sliding compound miter saw. When being used in this manner, the table 114 blocks the vision of the operator who is trying to cut a work piece below the table 114 on the rotatable table 102 or extension 106 below. The slots 502 effectively allow the operator to see through table 114.

Figure 22:
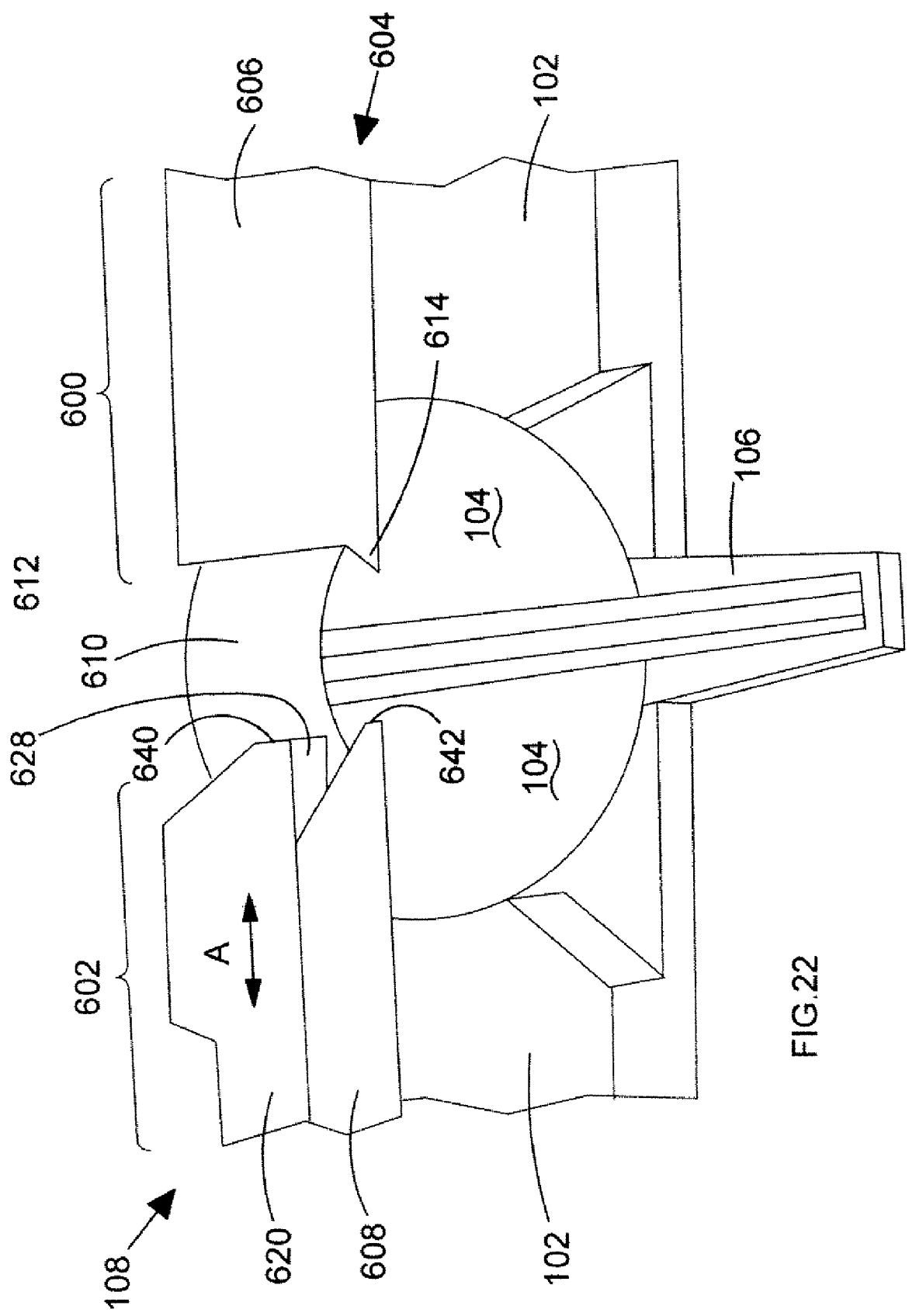
FIG. 22 shows a front view of the fence 108.

Referring to FIG. 1, the saw comprises a fence 108. The fence comprises two halves, a fixed fence 600 on the right as viewed in FIG. 22 and a moveable fence 602 on the left as shown in FIG. 15. U.S. Pat. No. 5,297,463 discloses a moveable fence and forms relevant prior art and is wholly incorporated herein by reference.

The fence preferably comprises a base section 604 which spans the full width of the saw. The base section 604 may comprise a straight right section 606, which forms the fixed fence 600 and a straight left section 608 which forms the lower half of the moveable fence 602. The two sections 606, 608 are preferably connected to each other by a curved portion 610 (see FIG. 17). The two sections 606, 608 and curved portion 610 may be made as a one piece construction and manufactured from cast steel or aluminium. Such a construction is well known in the art. The base section 602 is rigidly connected to the base 102 of the saw and transverses the rotatable table 104 in well known manner.

Referring to the fixed fence 600, the straight right section 606 is rigidly fixed to the base 102 and crosses slightly less than half of the right hand side of the rotatable table 104. The edge 612 of the fixed fence adjacent the curved portion 610 is vertical. The location of the vertical edge 612 is located such that it does not interfere with the blade 120 and blade guards when motor unit 118 is lowered vertically downwardly. A bulge 614 may be added to the base of the vertical edge 612 which projects towards the moveable fence 602. The bulge 614 in the present embodiment is triangular. The bulge 614 effectively moves the fence 600 closer to where the blade 120 cuts a work piece. By doing this, it provides support to the rear of a work piece closer to the area where blade 120 cuts through it. However, the remaining vertical edge 612 of the fixed fence 600 is kept at a greater distance from the blade 120 so that it does not interfere with it or the guards.

Figure 23:
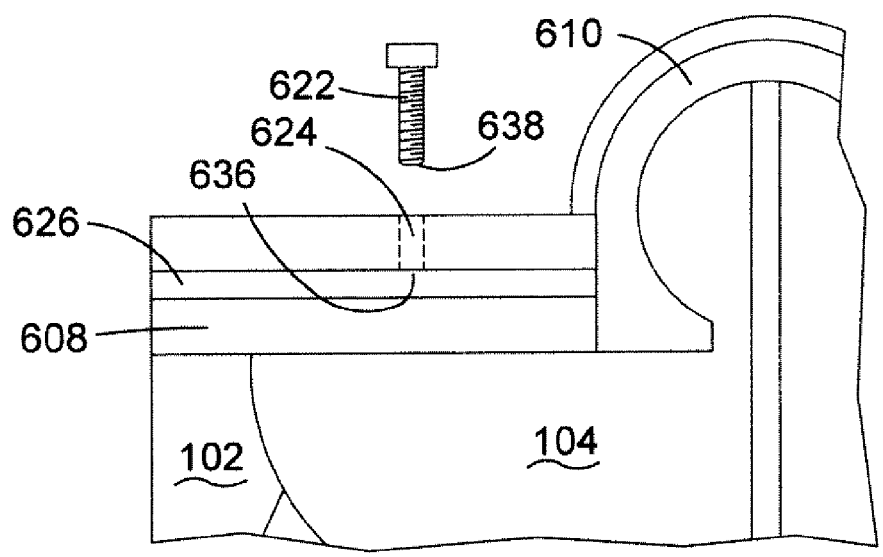
FIG. 23 shows a top view of the moveable fence with the upper half 620 removed.

Referring to the moveable fence 602, it preferably comprises two halves: a lower half formed by the straight left straight section 608 of the base section 604 and an upper slideable half 620. The upper half 620 can slide in the direction indicated by arrows A. As with the straight right section 606, the straight left section 608 is rigidly fixed to the base 102 and crosses slightly less than half of the left hand side of the rotatable table 104. An elongated slot may be formed in the top of the straight left section along its length (see FIG. 23 which shows a top view of the moveable fence with the upper half 620 removed). A threaded bolt 622 preferably passes through a threaded hole 624 formed in the side of the straight left section 608 from the rear side 626 of the straight left section 608 into the slot 626. The base 628 of the upper slideable half 620 preferably fits into and is capable of sliding along the slot 626.

Figure 24:
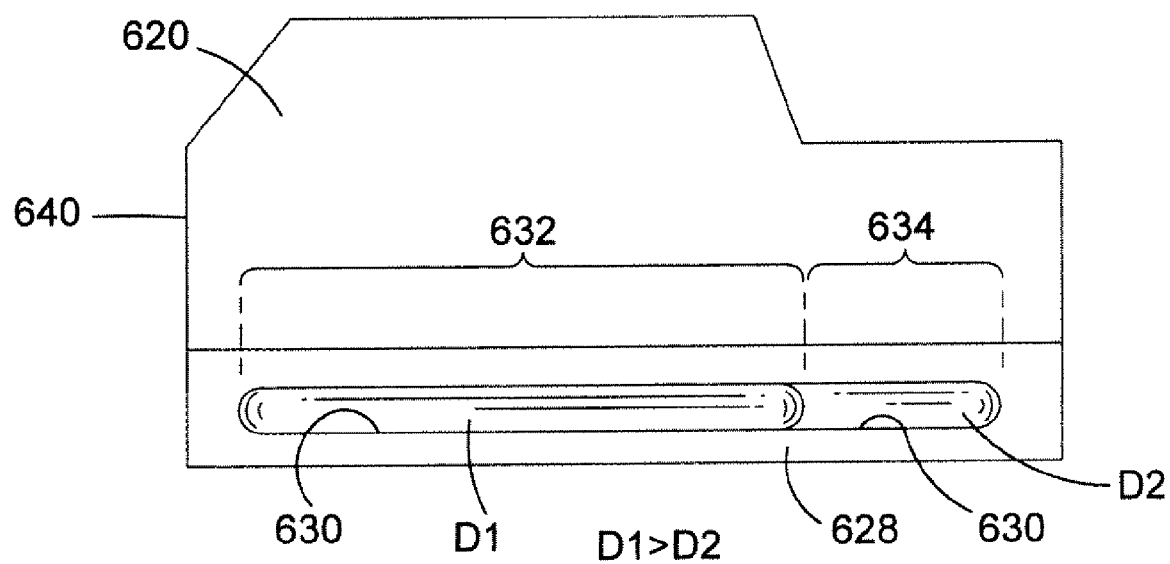
FIG. 24 shows the rear of the top section of the moveable part of the fence.
Figure 25:
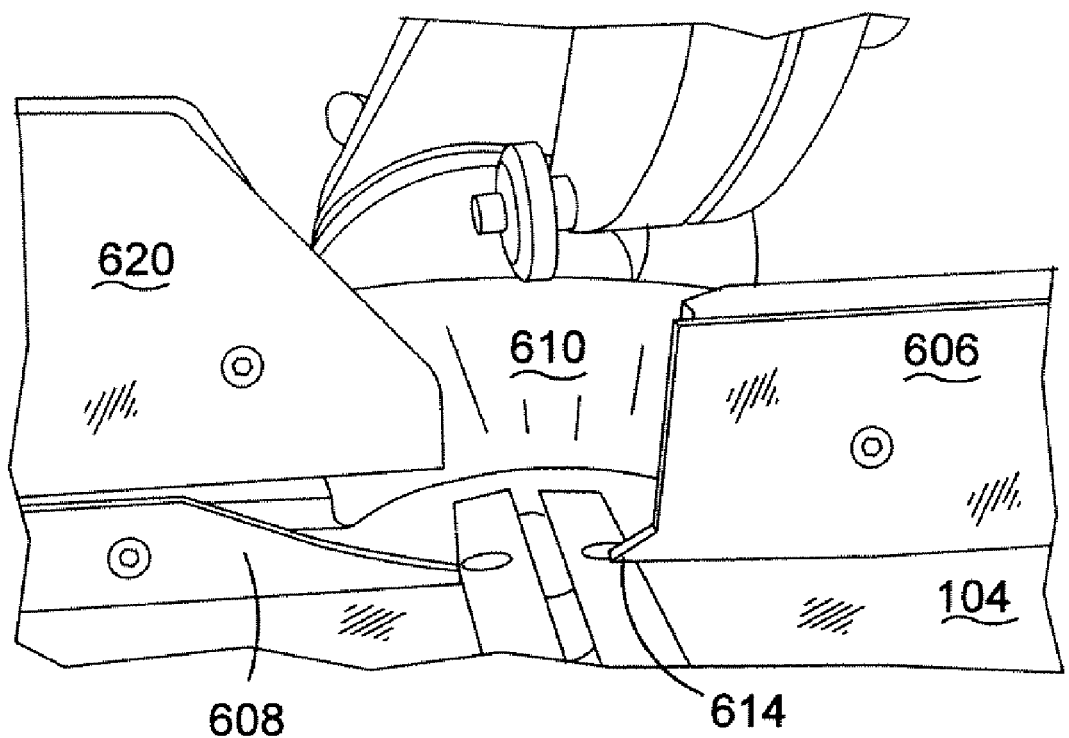
FIGS. 25 to 41 show further views of the fences as shown in FIGS. 22 to 24.
Figure 26:
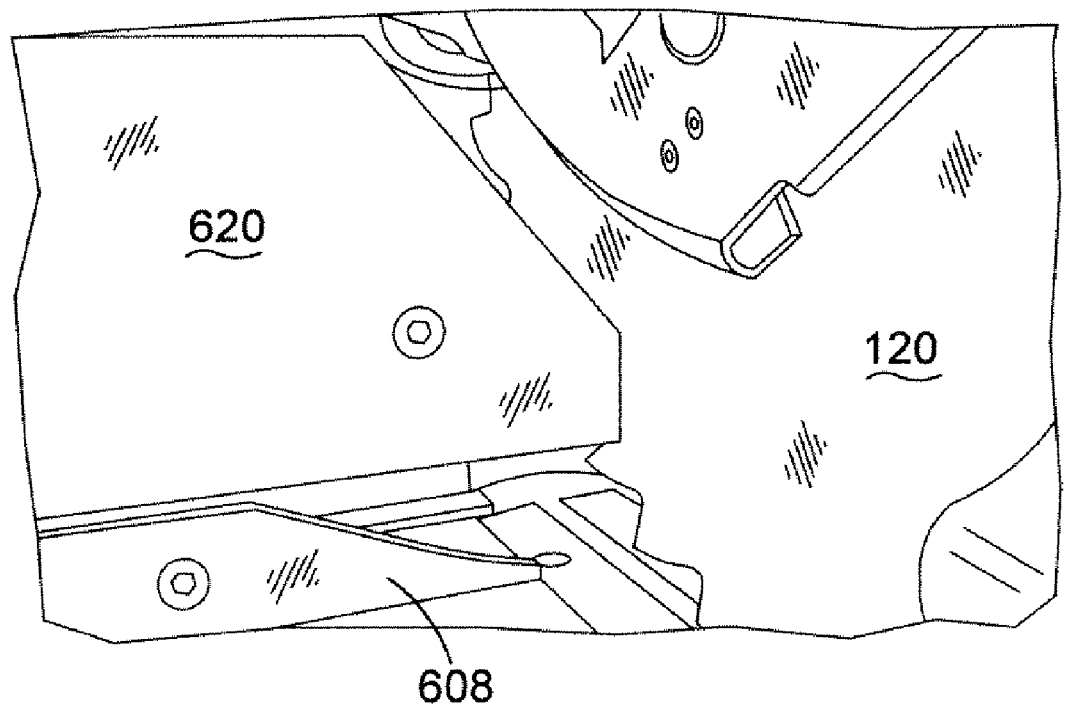
Figure 27:
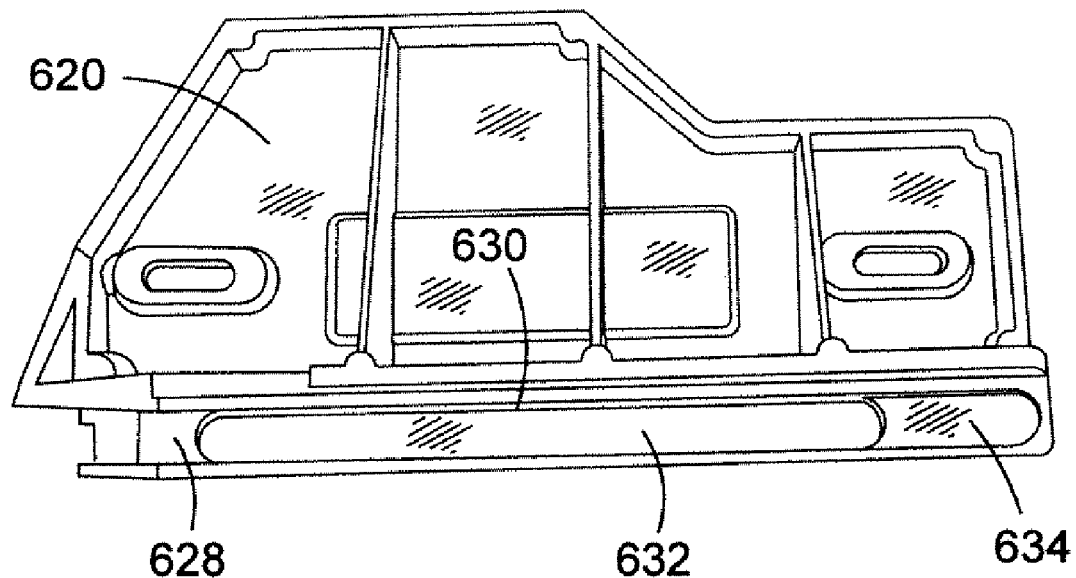
Figure 28:
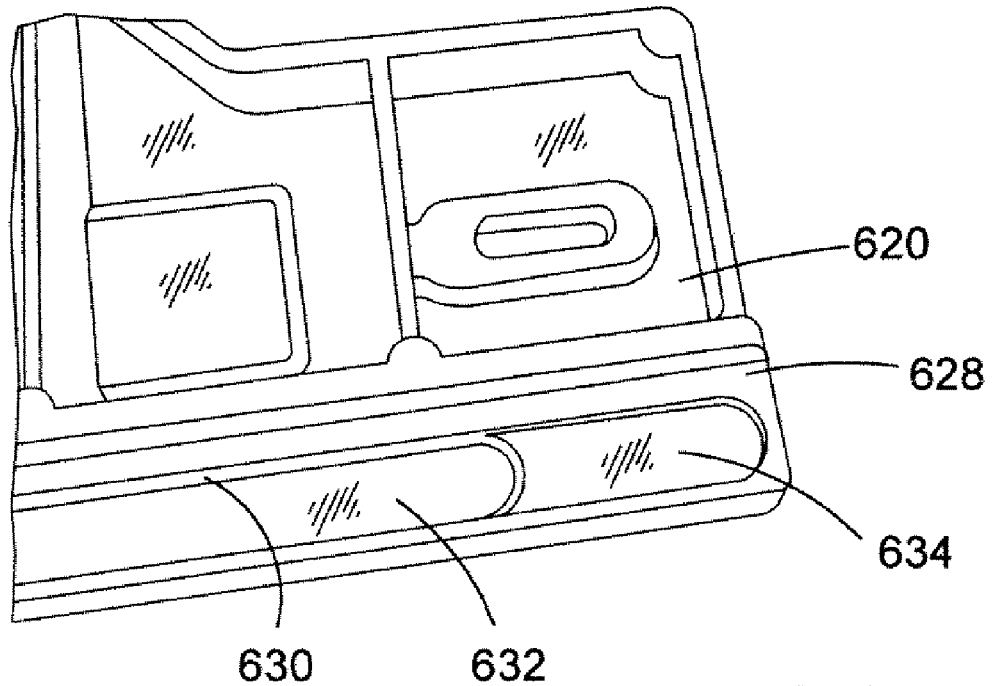
Figure 29:
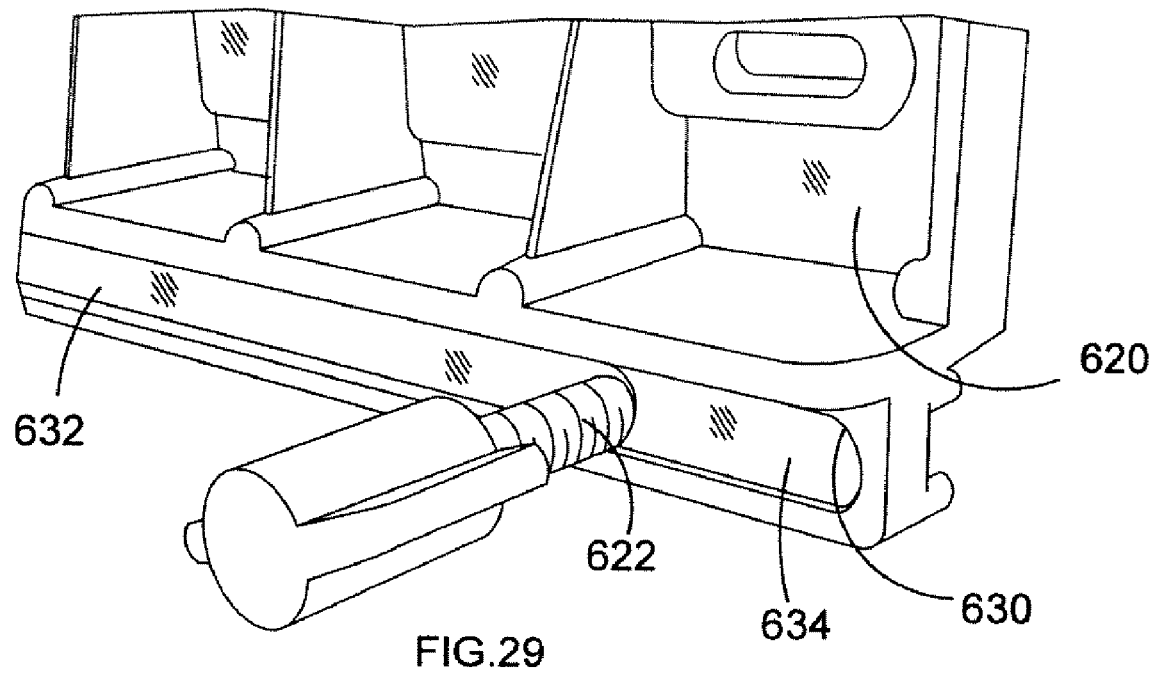
Figure 30:
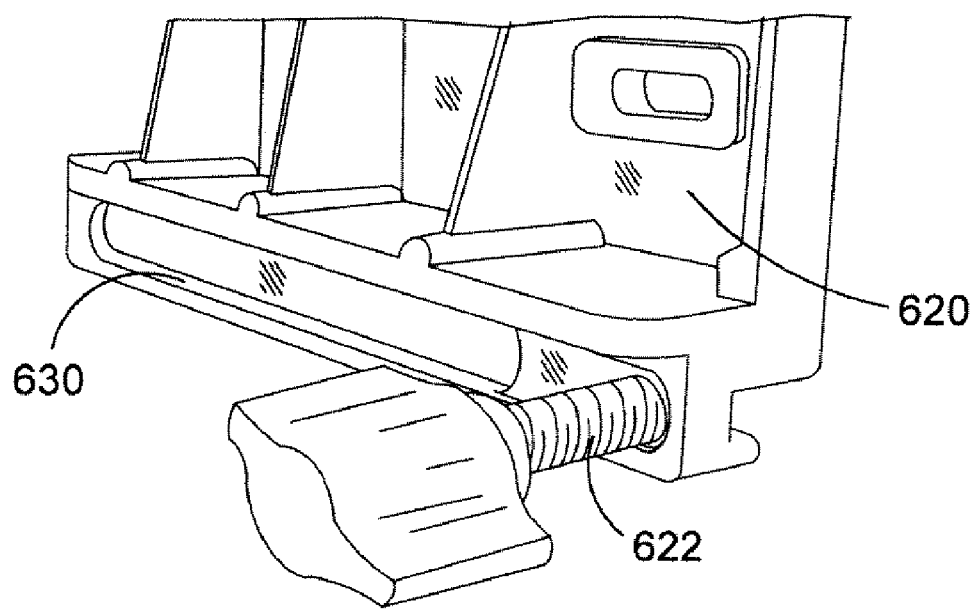
Figure 31:
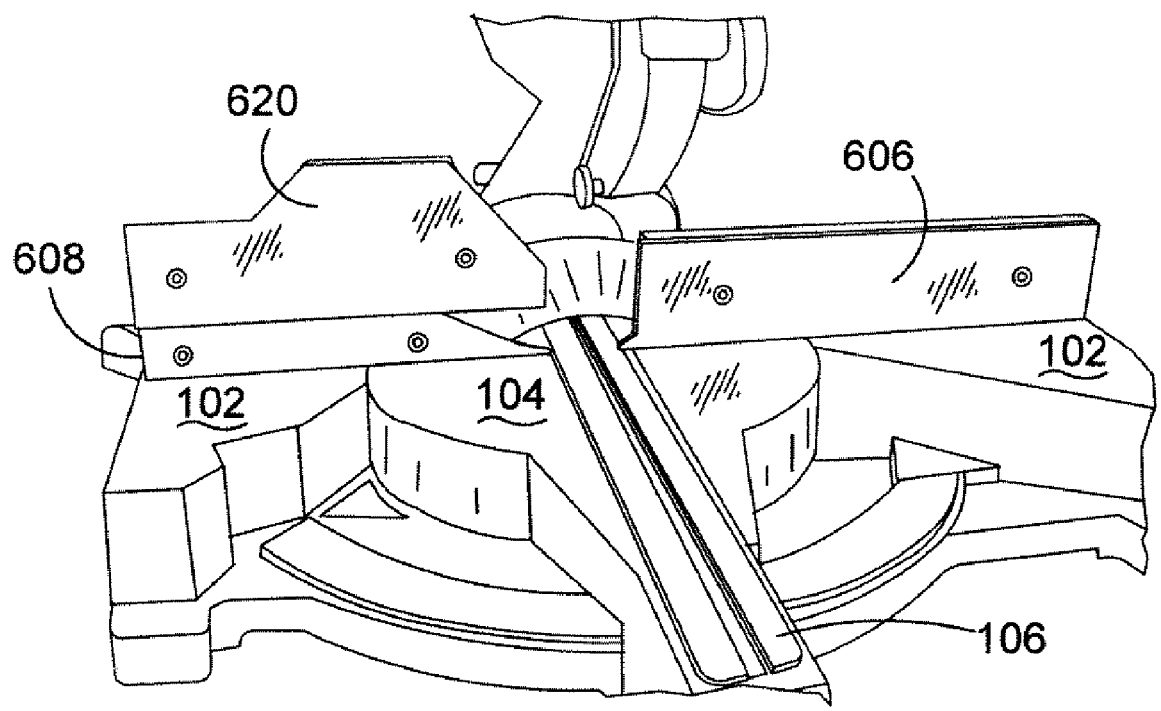
Figure 32:
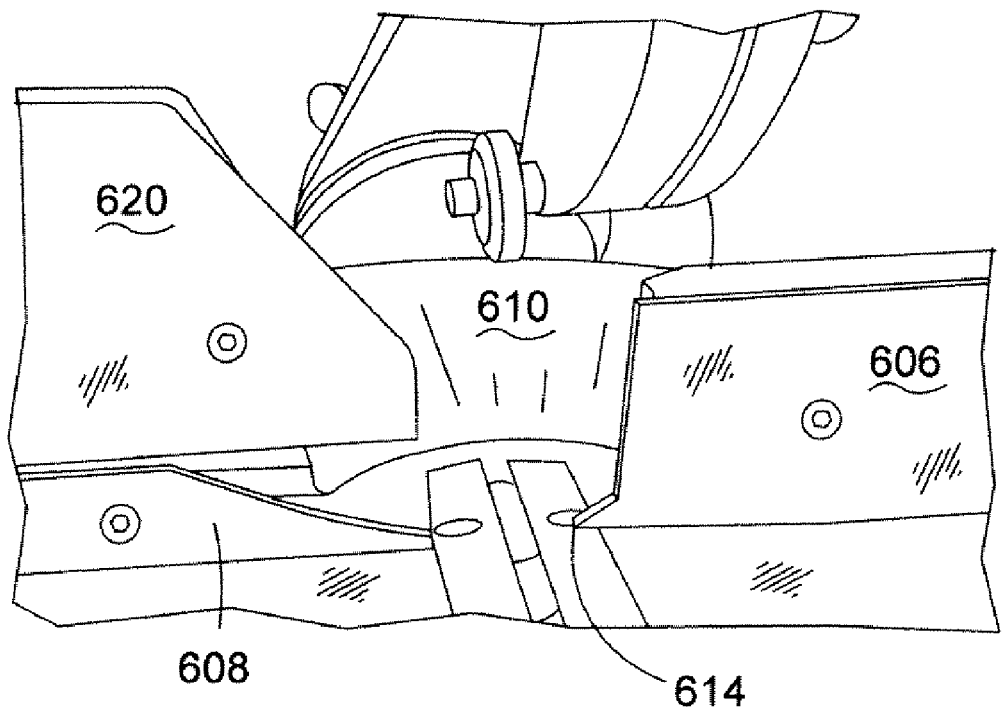
Figure 35:
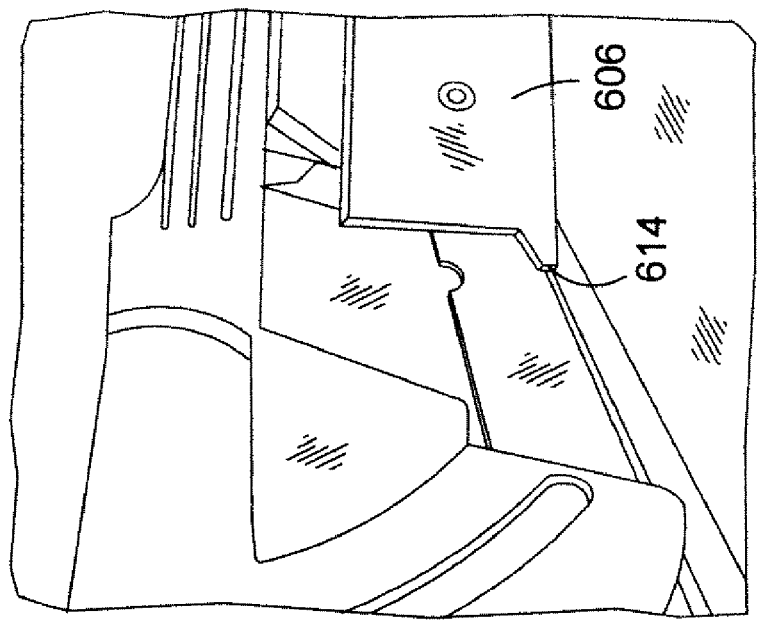
Figure 34:
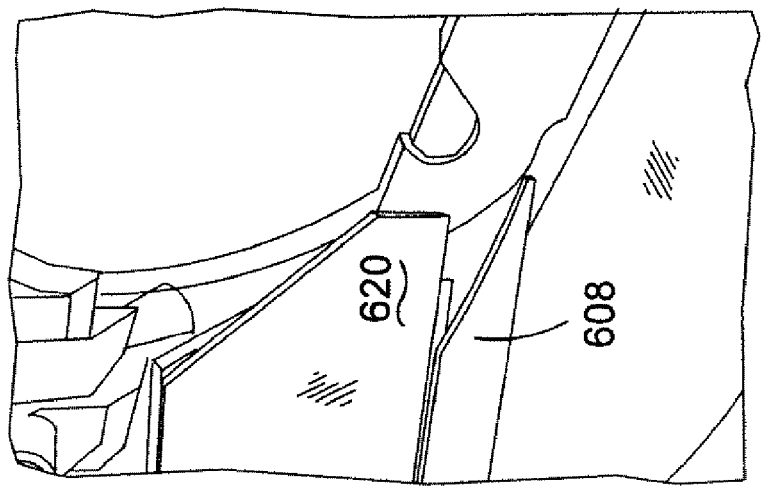
Figure 33:
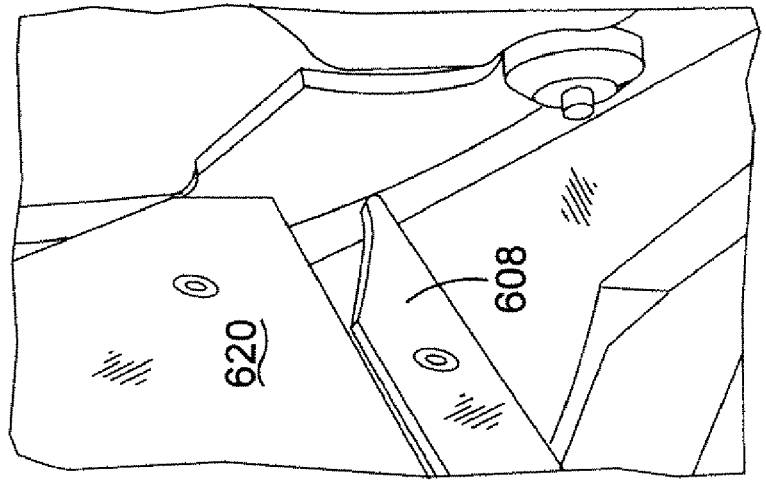
Figure 36:
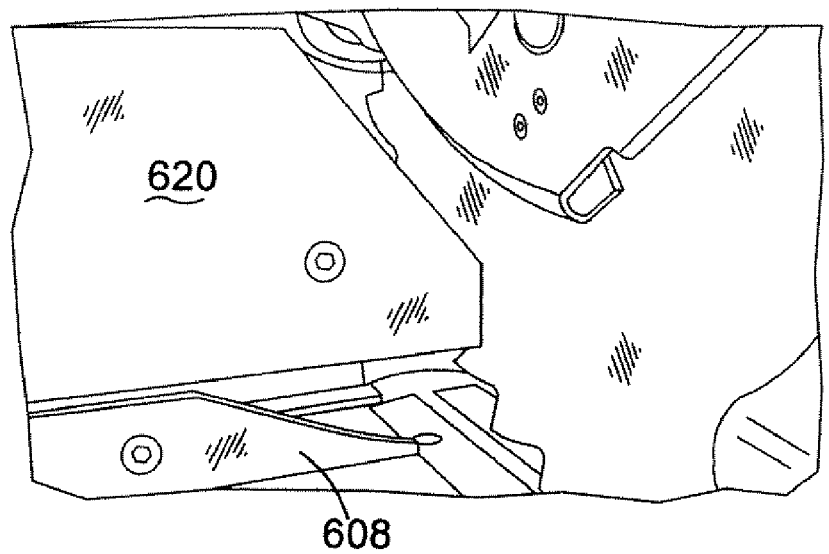
Figure 37:
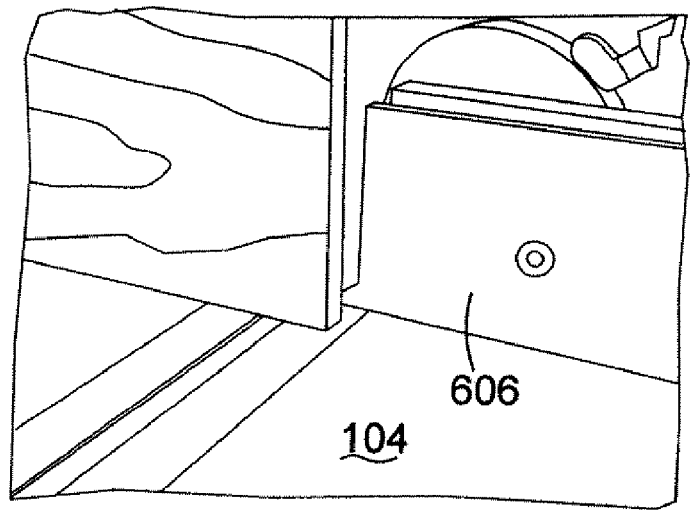
Figure 38:
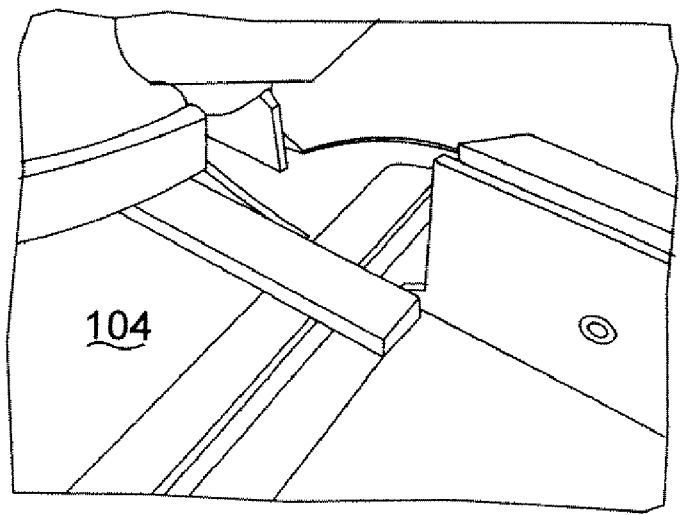
Figure 41:
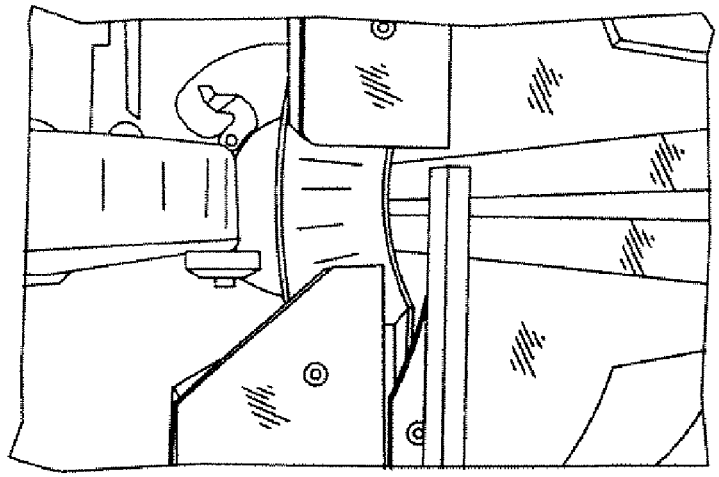
Figure 40:
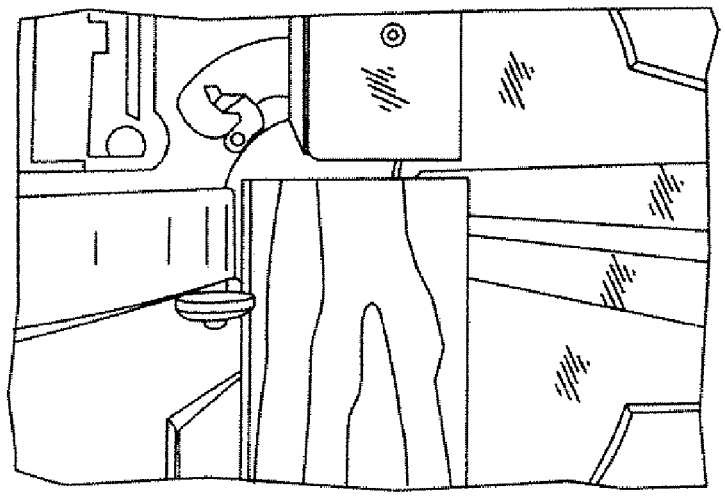
Figure 39:
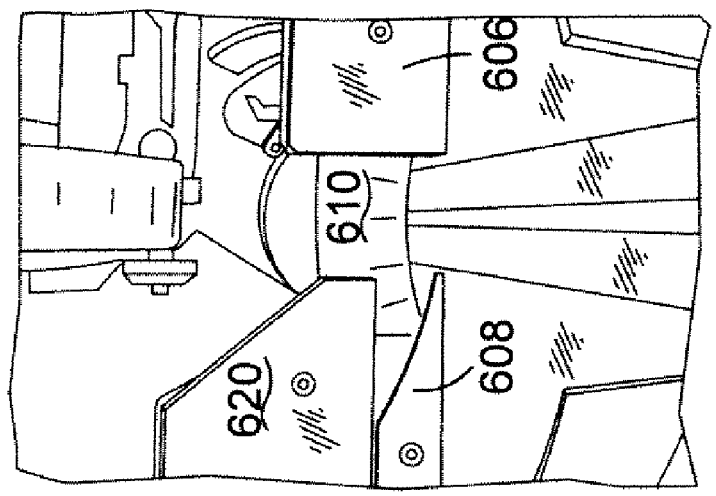

FIG. 24 shows the rear of the top section 620 of the moveable fence. A groove 630 is preferably formed in the base 628 of the upper slideable half 620 alone the length of the upper half 620. The groove 630 may have a first depth D1 alone the majority 632 of its length. The groove 630 may have a second depth D2 along the rest 634 of the groove 630. The second depth D2 is less than the first depth D1. When the base 628 of the upper half 620 is located within the groove 630, the groove 630 preferably faces towards the exit 636 of the threaded hole 624 within the slot 626. The bolt 622 is screwed through the hole 624 until its end 638 passes into the slot 626 and then into the groove 630 of the upper half 620.

While the end 638 of the bolt 622 remains in the groove 630, it is prevents the upper half 620 from being separated from the lower half 608 of the moveable fence. Screwing the bolt 622 into the groove 630 until it hits the base of the groove 630, preferably locks the upper half 620 to the lower half 608.

During normal operation, the end 638 of the bolt 622 is located in the majority 632 of the groove. The bolt 622 is prevented from entering the rest 634 by ensuring the end 638 of the bolt 622 is screwed sufficiently far enough into the groove 600 so that it is unable to travel into the rest 634 of the groove 630 as the rest 634 of the groove is too shallow to accommodate the amount of length of the bolt 622 extending into the groove 630. With the end 638 of the bolt 622 located at this first depth, the movement of the upper half 620 of the sliding fence 602 is restricted by movement of the bolt within the majority 632 of the groove 630 only (the "first range of movement"). If the bolt is then unscrewed slightly, to withdraw the end 638 of the bolt 622 from the groove 630 sufficiently to allow it to travel in the rest 634 of the groove 630, the bolt 622 can then slide the full length of the slot 630, allowing the upper half 620 to slide a greater distance (the "second range of distance").

When the bolt 622 is set so that the upper half 620 can travel the first range of movement, the upper half 620 can move towards or away from the cutting blade of the saw. However, the minimum distance between the end 640 of the upper half 620 of the moveable fence 602 and the blade is that same as that for the end 642 of straight left section 608. However, when the bolt 622 is set so that the upper half 620 can travel the second range of movement, the upper half 620 can again move towards or away from the cutting blade of the saw. However, the minimum distance between the end 640 of the upper half 620 of the moveable fence 602 and the blade is now less than that for the end 642 of straight left section 608. This allows the upper half 620 of a miter saw to have a bypass mode where it goes closer to the blade for precision cuts.

The advantage of this design of moveable fence is that it allows for a normal type of sliding fence stop for most cutting, while allowing a bypass position which allows the fence to be adjusted closer to the blade when more support is needed. The "stop" between the two regions of travel prevents the user from inadvertently sliding the fence too close to the blade in normal use.

FIGS. 25 to 41 show further views of the fences as described above with reference to FIGS. 22 to 24.

Persons skilled in the art may recognize other alternatives to the means disclosed herein. However, all these additions and/or alterations are considered to be equivalents of the present invention.

The invention claimed is:

1. A saw comprising:
a base assembly having a slot;
a motor unit pivotally mounted to the base assembly to allow the motor unit to pivot about a first axis towards the base assembly to perform a cutting operation, the motor unit having a motor, a spindle driven by the motor, and a blade mounted to the spindle and extending through the slot when performing the cutting operation;
a fixed fence mounted on the base assembly, the fixed fence having a groove for receiving a movable fence;
the movable fence having a tongue which is slidably received in the groove of the fixed fence, the tongue having a first groove extending along an axis, the first groove having a first depth and first and second ends, and a second groove adjacent to and coaxial with the first groove, the second groove beginning at the second end and having a second depth and a third end, where the first depth is different than the second depth;
a fence locking mechanism for locking the movable fence relative to the fixed fence, the fence locking mechanism having a member movable to enter the first and second grooves, wherein the member is movable to a first member position where the member can contact the first and second ends of the first groove allowing the movable fence to move relative to the fixed fence along a first range of movement but not allowing the movable fence to move beyond the second end, and the member being movable to a second member position where the member can contact the first end of the first groove and the third end of the second groove allowing the movable fence to move relative to the fixed fence along a second range of movement, wherein the second range of movement is longer than the first range of movement.

2. The saw of claim 1, wherein the first range of movement is defined by a first fence position at a first distance from the blade and a second fence position at a second distance longer than the first distance from the blade, and the second range of movement is defined by the second fence position and a third fence position at a third distance shorter than the first distance from the blade, the third fence position being closer to the motor unit than the first position.

3. The saw of claim 1, wherein the member is movable to a third member position not entering the first and second grooves.

4. The saw of claim 3, wherein the movable fence is removable from the fixed fence when the member is in the third member position.

5. The saw of claim 1, wherein the member is movable to a third member position where the member locks the position of the movable fence relative to the fixed fence.

* * * * *